A. H. WOODWARD.
COIN REGISTER.
APPLICATION FILED DEC. 23, 1913.
1,344,840.
Patented June 29, 1920.
19 SHEETS—SHEET 5.
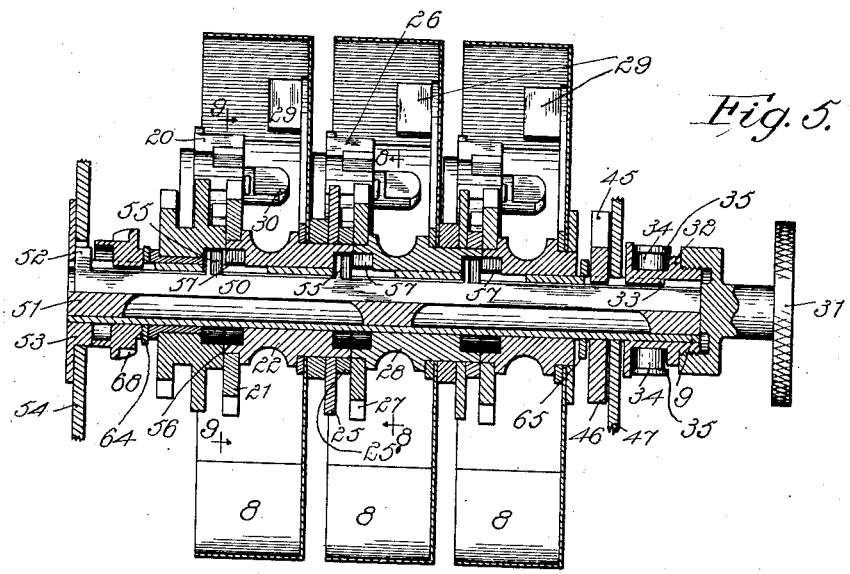
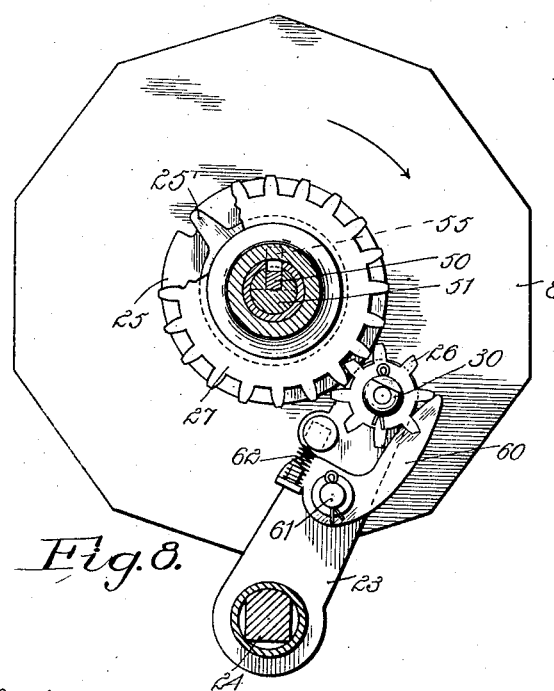
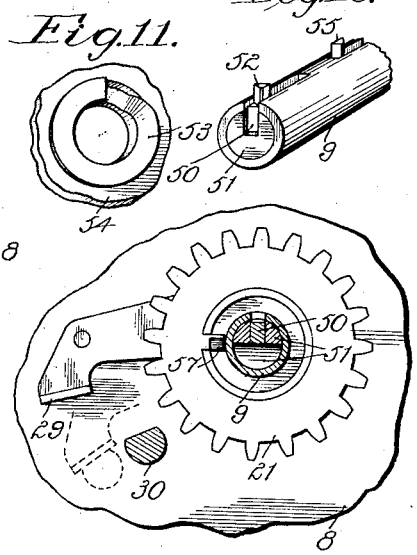
Witnesses:
Robert F. Bracke
Leonard W. Novander
Inventor
Arthur H. Woodward
By Brown Williams Bell Hanson & Boettcher
Attorneys

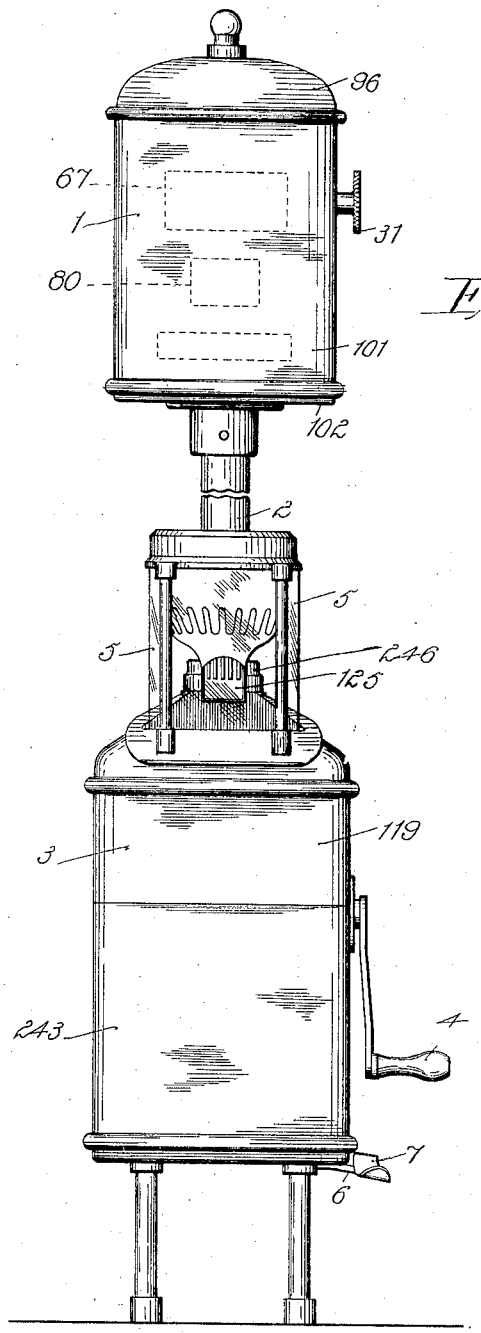

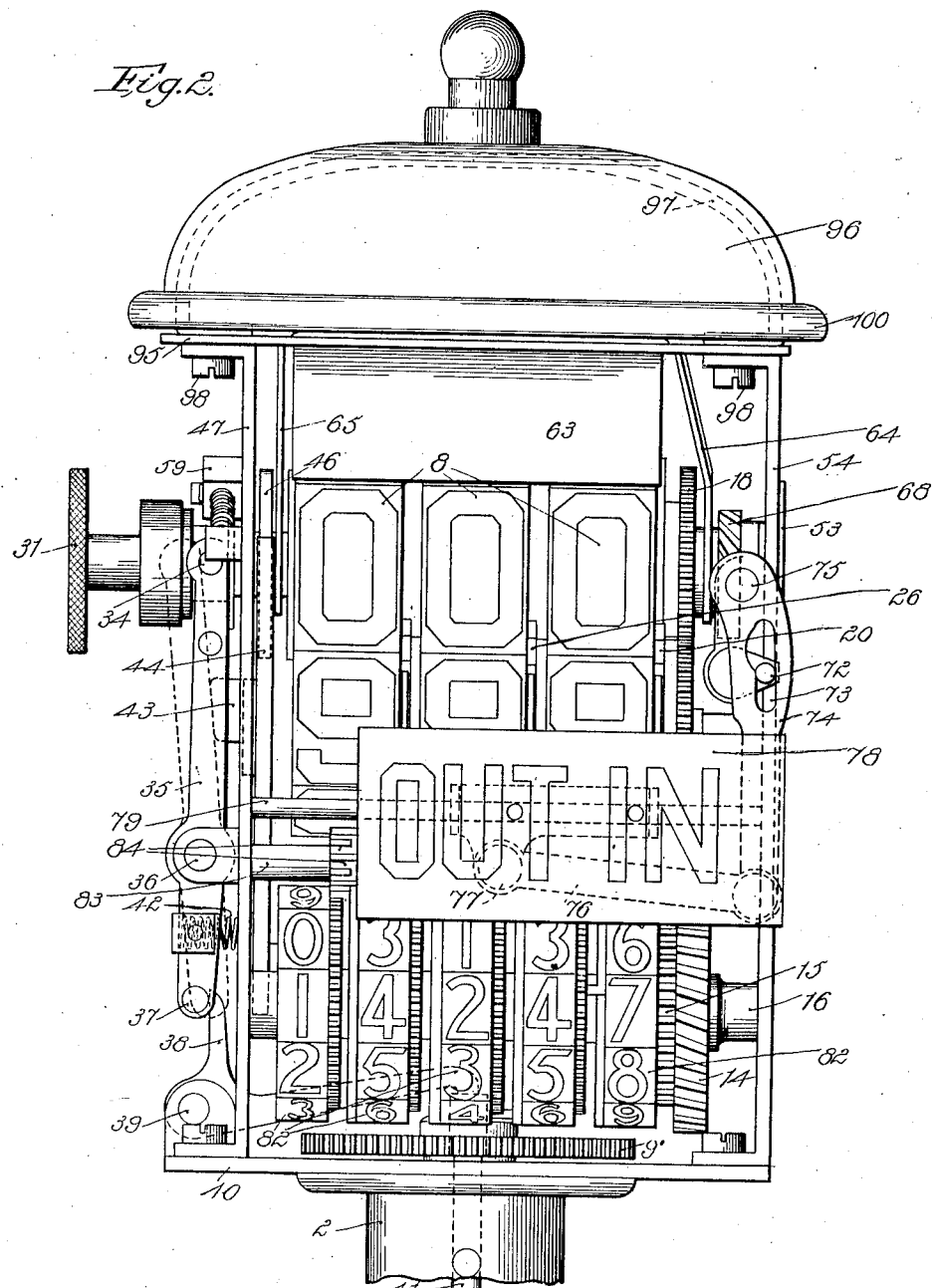

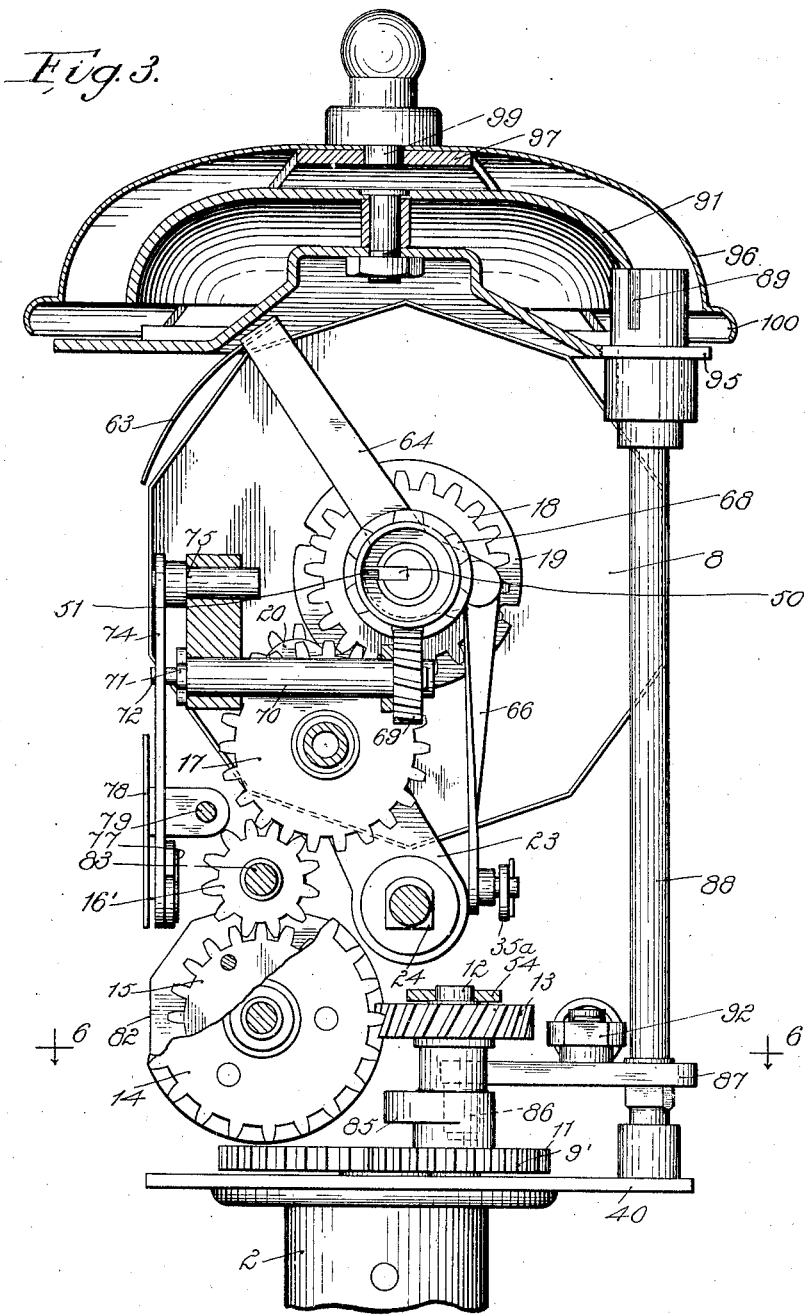

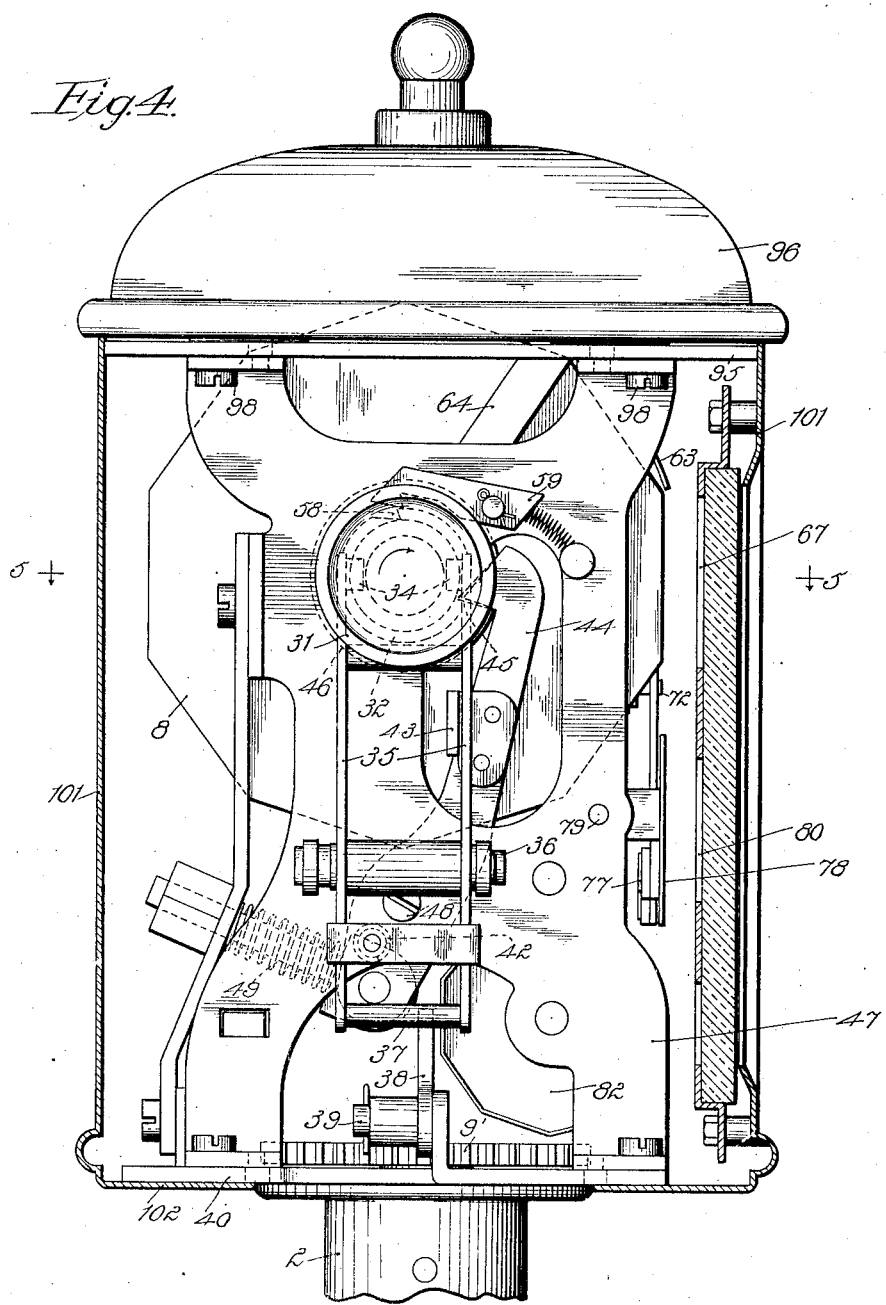

A. H. WOODWARD.
COIN REGISTER.
APPLICATION FILED DEC. 23, 1913.

1,344,840.

Patented June 29, 1920.
19 SHEETS—SHEET 6.

Witnesses:
Robert F. Bracke
Leonard W. Novander

Inventor
Arthur H. Woodward
By Brown, Williams, Bell, Hanson & Boettcher
Attorneys

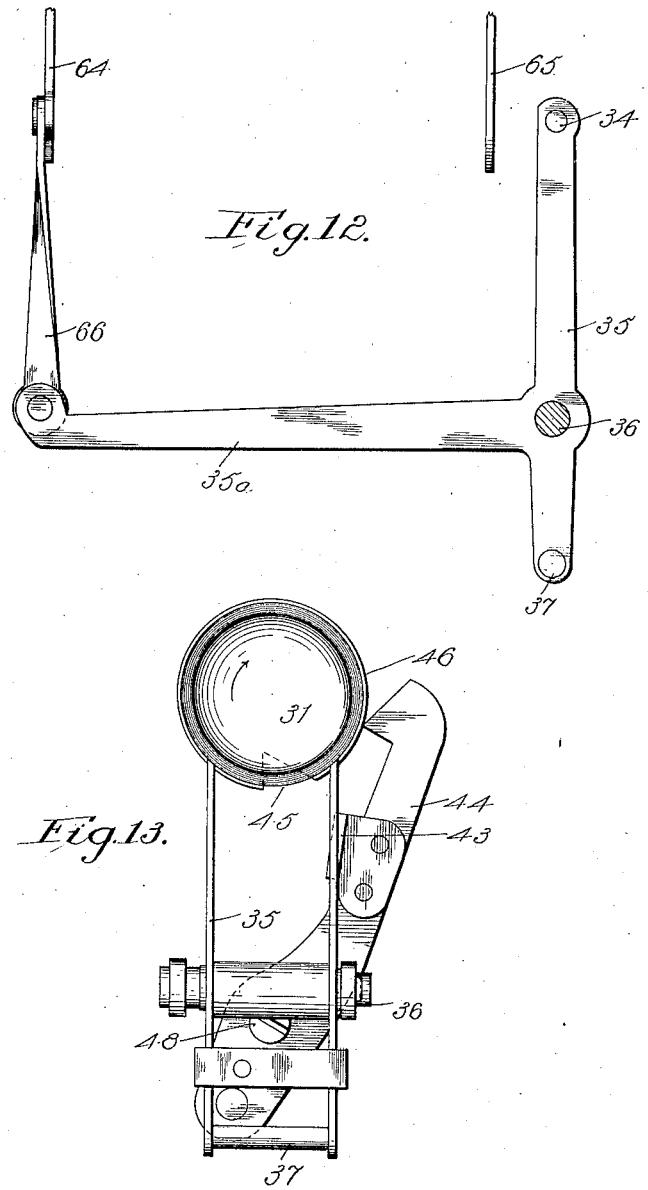

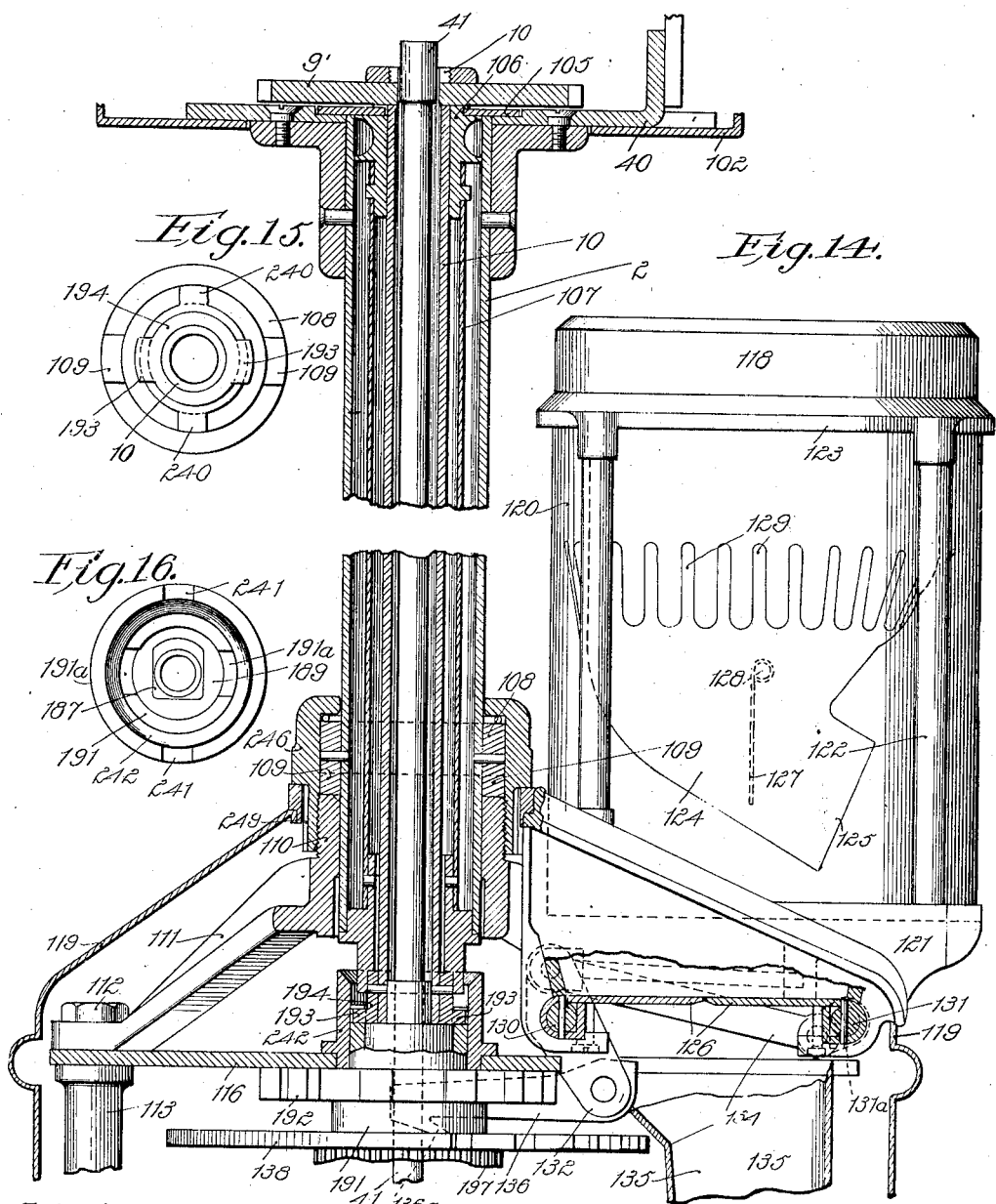

A. H. WOODWARD.
COIN REGISTER.
APPLICATION FILED DEC. 23, 1913.

1,344,840.

Patented June 29, 1920.
19 SHEETS—SHEET 9.

Witnesses:
Robert F. Brack
Leonard W. Noveander

Inventor
Arthur H. Woodward
By Brown Williams Bell Hanson & Boettcher
Attorneys

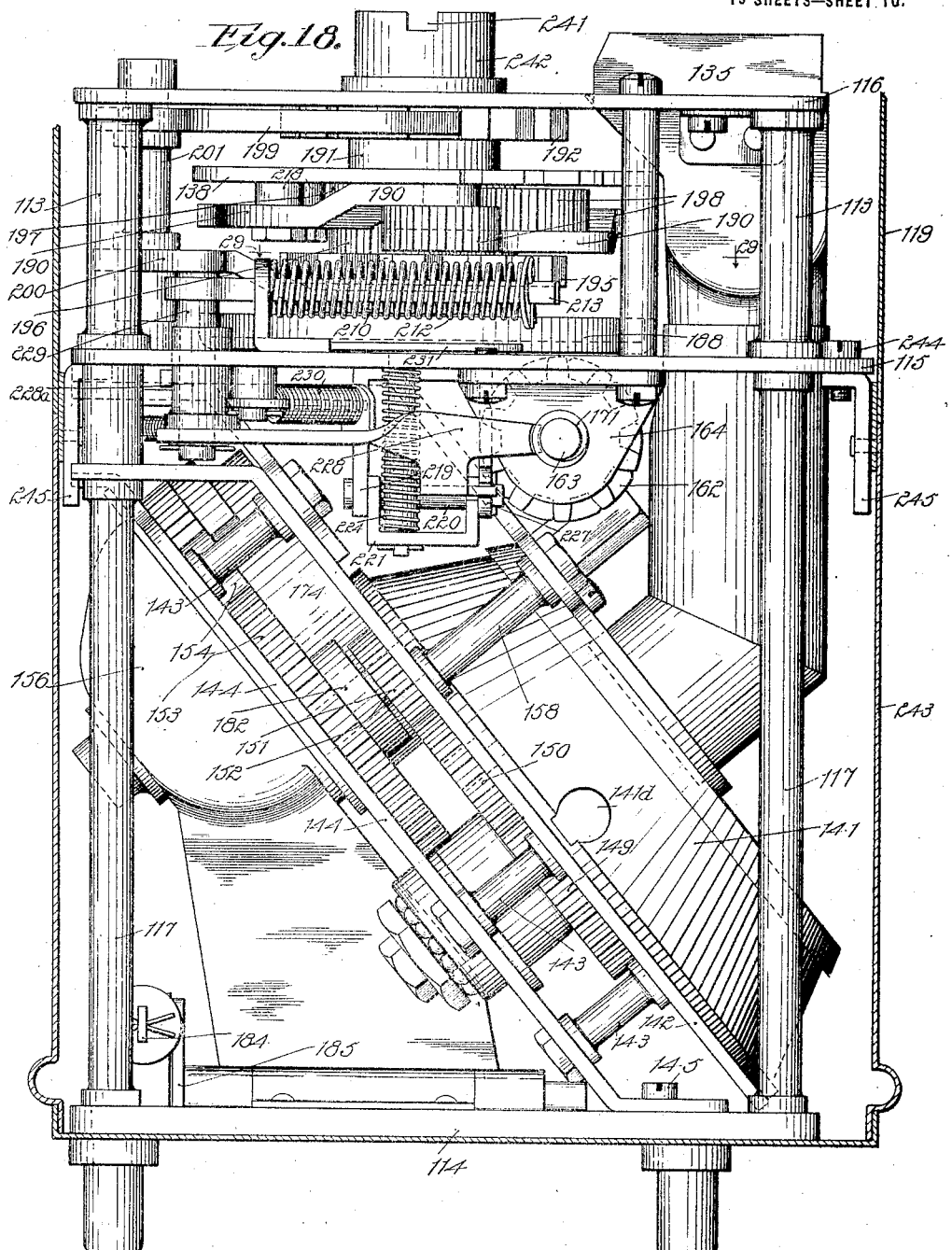

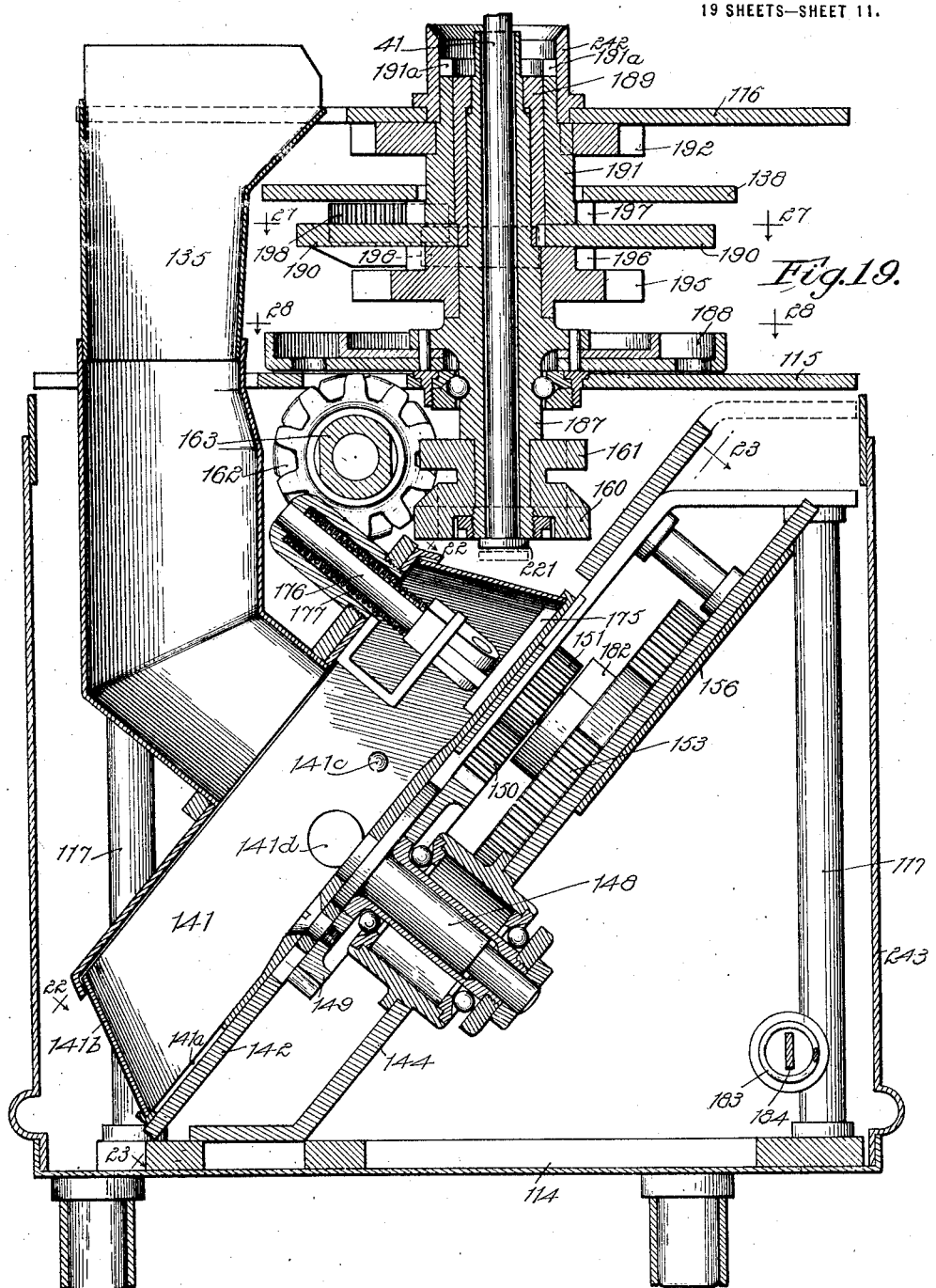

A. H. WOODWARD.
COIN REGISTER.
APPLICATION FILED DEC. 23, 1913.

1,344,840.

Patented June 29, 1920.
19 SHEETS—SHEET 12.

Witnesses:
Robert F. Brack
Leonard W. Novander

Inventor
Arthur H. Woodward
By Brown Williams Bell Hanson & Boettcher
Attorneys

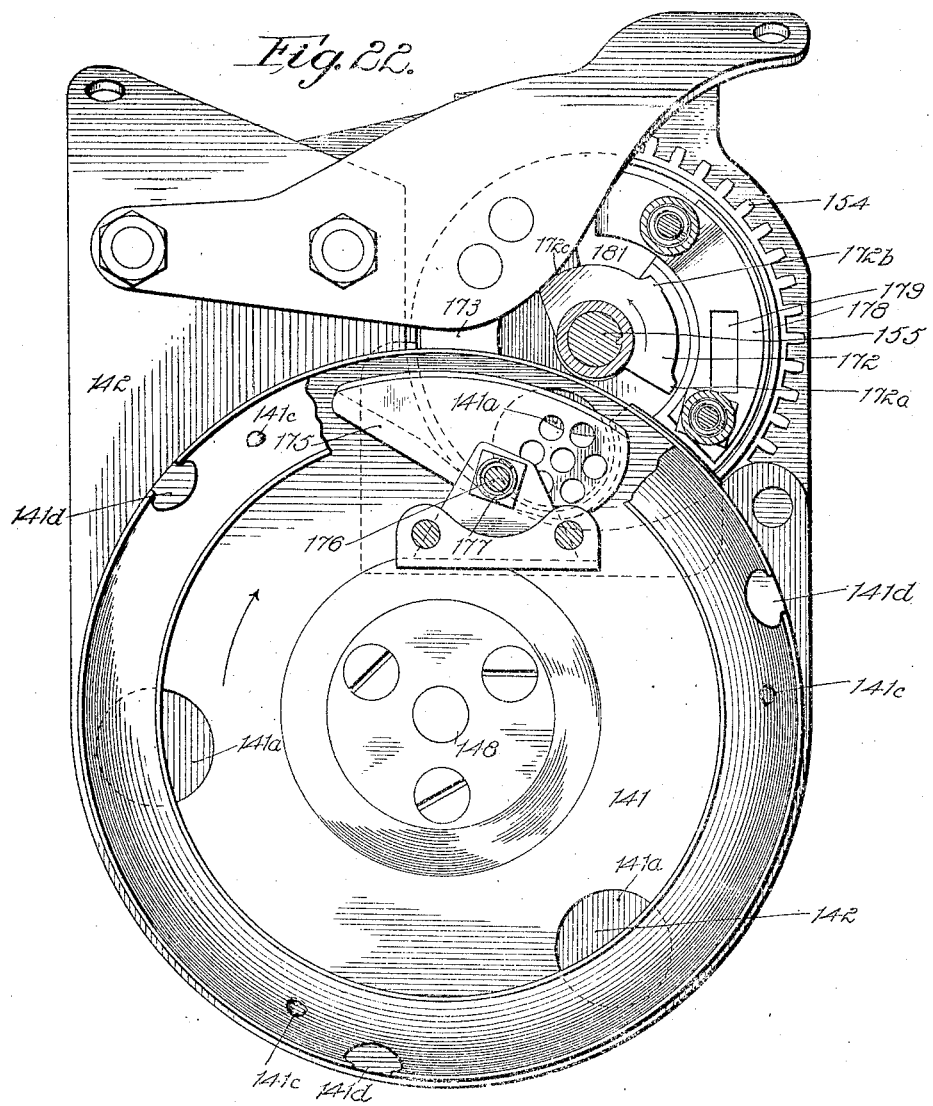

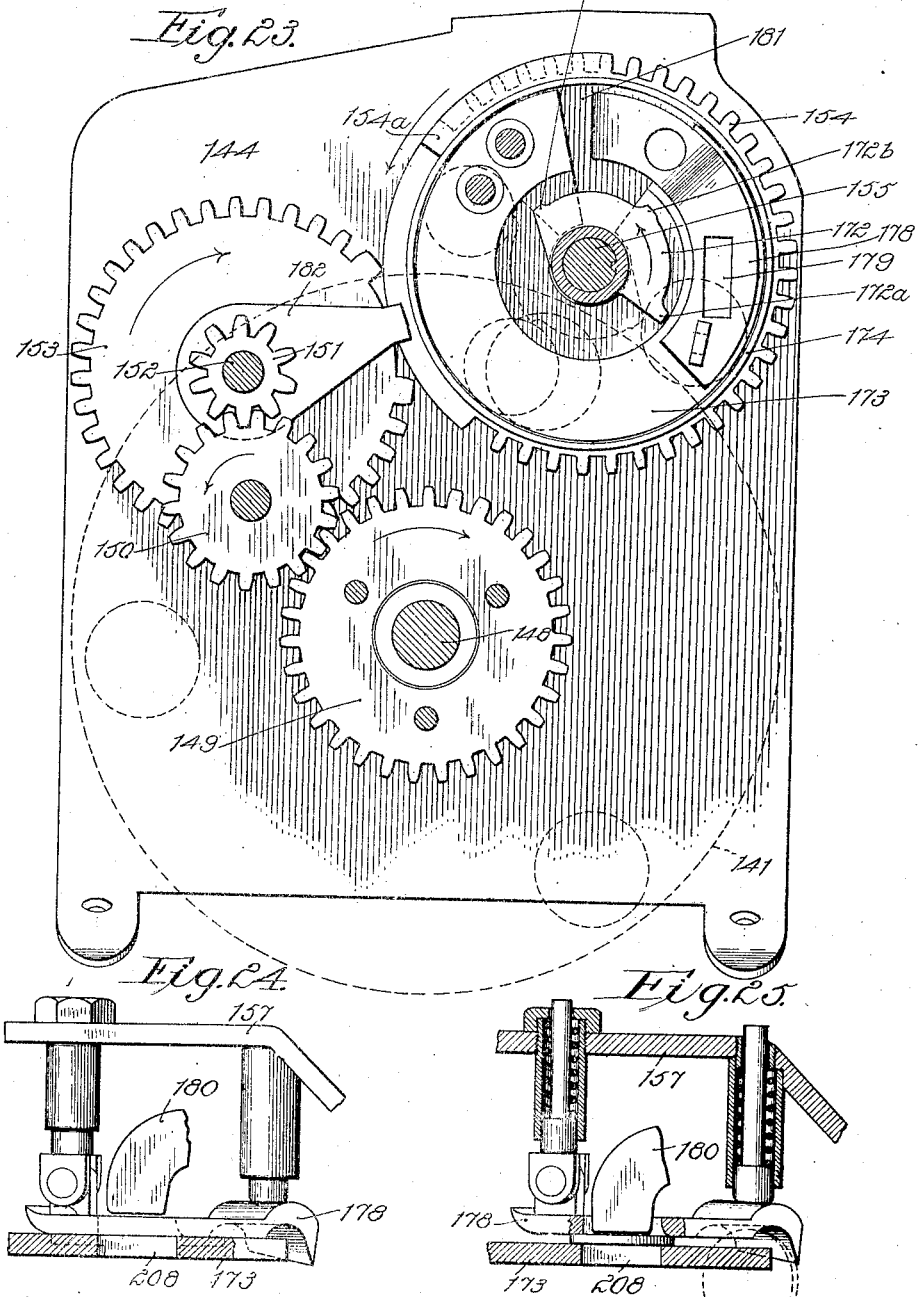

A. H. WOODWARD.
COIN REGISTER.
APPLICATION FILED DEC. 23, 1913.

1,344,840.

Patented June 29, 1920.
19 SHEETS—SHEET 16.

Witnesses:
Robert F. Bracke
Leonard W. Novander.

Inventor
Arthur H. Woodward
By Brown Williams Bell Hanson & Boettcher
Attorneys

A. H. WOODWARD.
COIN REGISTER.
APPLICATION FILED DEC. 23, 1913.

1,344,840.

Patented June 29, 1920.
19 SHEETS—SHEET 17.

Witnesses:
Robert F. Bracke
Leonard W. Novander

Inventor
Arthur H. Woodward
By Brown Williams Bell Hanson & Boettcher
Attorneys

A. H. WOODWARD.
COIN REGISTER.
APPLICATION FILED DEC. 23, 1913.
1,344,840.
Patented June 29, 1920.
19 SHEETS—SHEET 18.
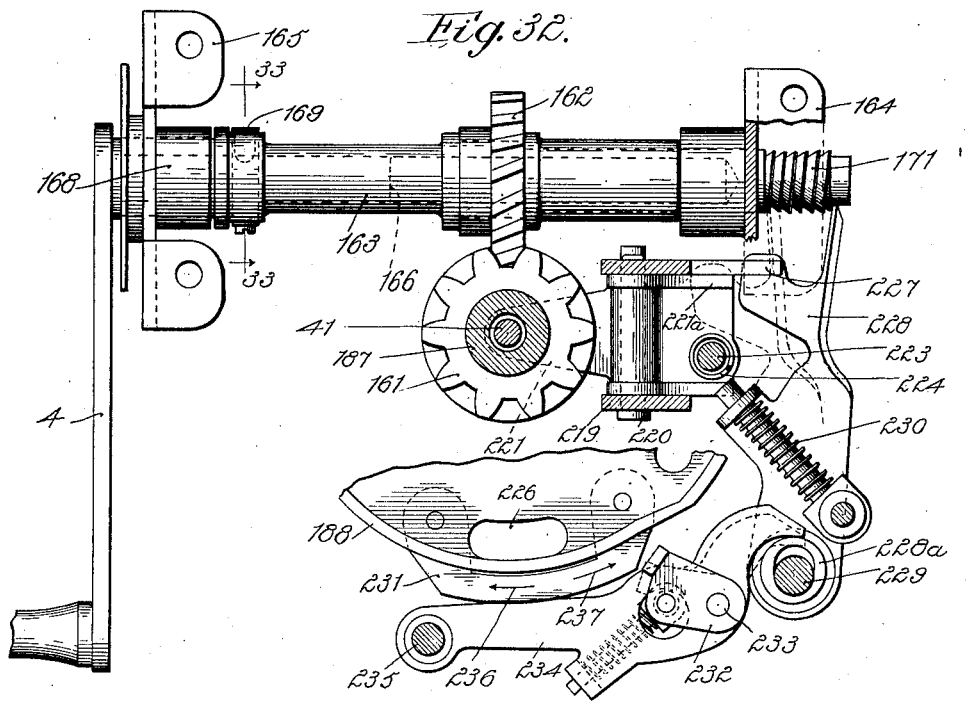
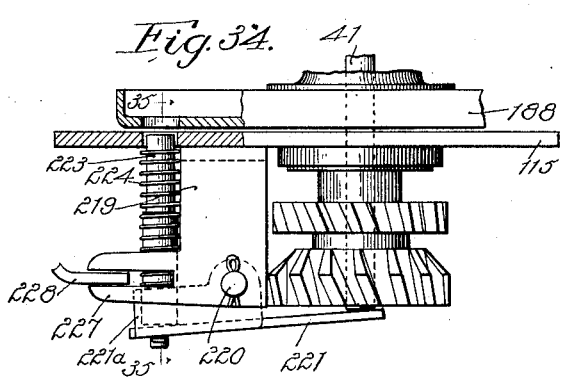
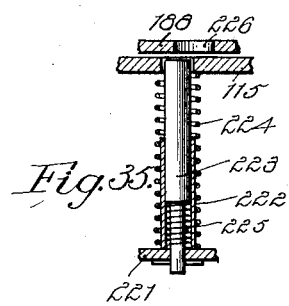
Witnesses:
Robert F. Brack
Leonard W. Novander
Inventor
Arthur H. Woodward
By Brown Williams Bell Hanson & Boettcher
Attorneys

A. H. WOODWARD.
COIN REGISTER.
APPLICATION FILED DEC. 23, 1913.

1,344,840.

Patented June 29, 1920.
19 SHEETS—SHEET 19.

Witnesses:
Robert F. Brack
Leonard W. Novander

Inventor.
Arthur H. Woodward
By Brown Williams Bell Hanson & Boettcher
Attorneys

UNITED STATES PATENT OFFICE.

ARTHUR H. WOODWARD, OF ALTADENA, CALIFORNIA, ASSIGNOR, BY MESNE ASSIGNMENTS, TO JOHNSON FARE BOX COMPANY, OF CHICAGO, ILLINOIS, A CORPORATION OF NEW YORK.

COIN-REGISTER.

1,344,840.  Specification of Letters Patent.  Patented June 29, 1920.

Application filed December 23, 1913. Serial No. 808,381.

*To all whom it may concern:*

Be it known that I, ARTHUR H. WOODWARD, a citizen of the United States, residing at Altadena, in the county of Los Angeles and State of California, have invented a certain new and useful Improvement in Coin-Registers, of which the following is a full, clear, concise, and exact description, reference being had to the accompanying drawings, forming a part of this specification.

My invention relates to an improved form of coin register, adapted for use particularly in connection with fare registering mechanism such as used upon street cars, trains, etc., where it is desirable for the conductor to receive the fare in the form of money and keep a visible indication of the number of fares received or the amount of such fares or both, as the case may be.

My invention relates to a form of mechanism in which the fares or coins deposited are not retained in the registering machine, but, on the other hand, pass through the machine as a result of their registration and are thus delivered to the attendant so as to avoid the necessity for the attendant to be provided with a considerable quantity of change in excess of the money deposited in the register. This form of machine is shown in the present case combined with fare registering devices adapted for use particularly in connection with street car work, so that an indication is afforded at all times of the total number of fares or the total amount registered, the fares registered on each trip and the direction of the trip.

This combination, broadly, I do not claim in the present application, as it is shown and claimed in an earlier copending application. The present invention, however, is an improvement upon the earlier invention referred to in many features of the combination of the fare registering devices and the coin register, as a result of which the combination as a whole operates in a different manner from the mechanism shown in the earlier application to produce a different result.

My present invention also provides an improved form of registering mechanism for indicating the fares and amounts registered, so disposed as to be elevated in plain sight of the passengers in the car, and, in addition, the coin registering mechanism provides improved means for receiving, sorting and counting coins deposited in the machine.

By my present invention I provide a mechanism in which the registering devices are normally free from the operating shaft of the machine, gearing being provided for operatively connecting the registering devices with the operating shaft when a coin is in place in the coin counting mechanism to prevent the free operation of certain of the parts which otherwise move uninterruptedly during rotation of the operating shaft. When this motion is interrupted it causes such a changed condition of the connecting gearing that further rotation of the operating shaft advances the registering mechanism an amount determined by the size of the coin inserted in the coin counting mechanism. Furthermore, the complete cycle of operation of the coin counting mechanism is so provided that each coin has its own definite time of modifying the action of the connecting gearing so as to advance the registering mechanism an amount proportionate to the value of said coin, and thus I am able to register upon registering devices coins of different value, which are automatically sorted in the coin mechanism so that a continuous motion of the operating shaft serves to sort and register all of the coins deposited in the coin sorting mechanism, whether they are deposited singly or simultaneously and whether they are of the same or different size and value, as long as the coins deposited are within the range of value for which the machine is designed and constructed.

The several drawings illustrating my invention are as follows:

Figure 1 shows in side elevation the complete machine, consisting of the registering mechanism and coin sorting mechanism.

Fig. 2 shows the registering devices in front view, with the inclosing casing removed to more fully show the operating parts contained therein.

Fig. 3 is a right hand side view of the parts shown in Fig. 2;

Fig. 4 is a left hand side view of the parts shown in Fig. 2.

Fig. 5 is a horizontal sectional view through the parts shown in Figs. 2, 3 and 4, taken along the line 5—5 in Fig. 4.

Fig. 8 is a vertical sectional view taken through the parts shown in Fig. 5 along the line 8—8.

Fig. 9 is a vertical sectional view of the parts shown in Fig. 5, taken along the line 9—9.

Fig. 10 shows in perspective view the left hand portion of the tube shown in Fig. 5 for supporting the indicator wheels.

Fig. 11 is a right hand side view of the cam shown in Fig. 5 around the left hand end of the supporting tube for the indicator wheels.

Fig. 12 is a detailed view of the blind operating mechanism associated with the registering devices shown in Figs. 2, 3 and 4.

Fig. 13 is a left hand view of the resetting knob associated with the mechanism shown in Figs. 2, 3 and 4, together with the interlocking mechanism operated thereby.

Fig. 14 is a vertical sectional view through the center of the connecting column between the registering mechanism and the coin counting mechanism.

Fig. 15 is a bottom view of the connecting column removed from the coin counting mechanism.

Fig. 16 is a top view of the parts carried by the coin counting mechanism which engage the bottom end of the connecting column when the latter is in place.

Fig. 17 is a front view of the coin counting mechanism with a part of the casing removed and the remainder of said casing cut away to show the coöperating parts.

Fig. 18 is a right hand side view of the parts shown in Fig. 17, with the casing partly removed.

Fig. 19 is a vertical sectional view of the parts shown in Figs. 17 and 18, taken along the line 19—19 in Fig. 17.

Fig. 22 is a plan view of the coin pan which receives the coins and delivers them to the coin sorting mechanism, this view being taken along the line 22—22 in Fig. 19.

Fig. 23 shows in a view similar to Fig. 22 the gearing used to drive the coin pan and the coin sorting mechanism, this view being taken along the line 23—23 in Fig. 19.

Fig. 24 is a detailed view of the wiper mechanism and counting finger employed in connection with the sorting devices shown in Fig. 20, when there is no coin in the sorting mechanism.

Fig. 25 shows, in a view similar to Fig. 24, the wiper and counting finger with a coin in place to interrupt the motion of the counting finger to change the relation of the gearing connecting the operating shaft with the indicating devices. In this figure the devices are shown partly in section to afford a better understanding of the construction.

Fig. 32 is a detailed view of the operating shaft and the interlocking mechanism connected therewith for controlling the actuation of the resetting mechanism of the register.

Fig. 34 is a detailed view showing the interlocking devices between the resetting mechanism and the operating mechanism of the coin sorter and counter for preventing operation of said sorter and counter during the resetting operation.

Fig. 35 is a sectional view of the locking bolt shown in Fig. 34, taken along the line 35—35.

Similar numerals refer to similar parts throughout the several views.

Figure 6:
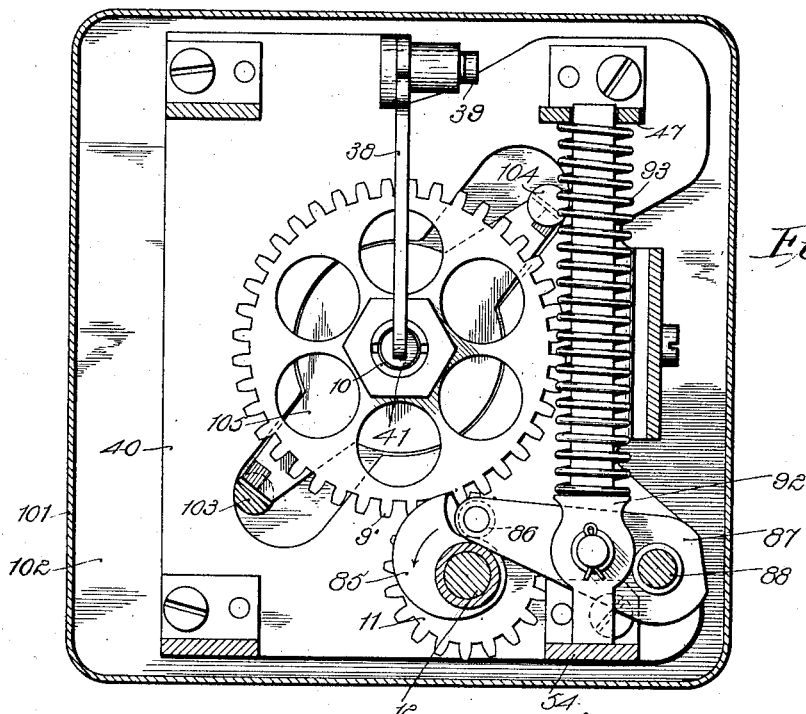
Fig. 6 shows in horizontal sectional view the parts shown in Figs. 2, 3 and 4, taken along the line 6—6 in Fig. 3.
Figure 7:
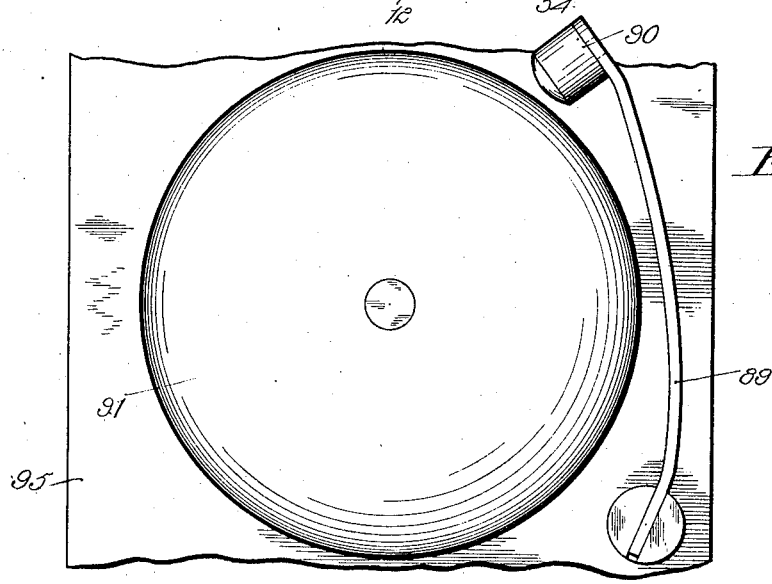
Fig. 7 is a top view of the gong mechanism shown in Fig. 3, the cover of the registering mechanism being removed to more clearly show the parts.

As shown in Fig. 1, the complete mechanism consists of registering devices collectively indicated by 1, connected by a column 2 with coin sorting and counting devices collectively indicated by the numeral 3.

The counting and sorting mechanism is provided with an operating crank 4, which may readily be inserted into place in the end of the operating shaft or removed therefrom, as desired. The coin sorting and counting mechanism is provided with a hopper 5 for receiving the coins directly from the depositor, and from this hopper they pass into and through the coin sorting and counting mechanism 3, being delivered upon the plate 6, which may be depressed by placing the hand upon the operating member 7 connected therewith and depressing the same so that the coins which have passed through the sorting and counting mechanism are delivered into the hand of the operator.

The fare indicating and registering mechanism is shown more clearly in Figs. 2 to 13, inclusive. As shown in these views, trip indicator wheels 8 are provided, which are rotatively mounted upon a supporting tube 9, which does not rotate as the trip indicator wheels are moved to indicate the number of fares received. These wheels are operated by means of gearing driven by the gear 9' connected with the upper end of a tube 10 extending outward through the column 2 to be operated by means of the coin sorting and counting mechanism.

The gear 9' meshes with a gear 11 secured to a sleeve rotatably mounted upon a shaft 12, and to the upper end of said sleeve there is secured a skew gear 13, which meshes with a similar gear 14 secured to a spur gear 15 and rotatably mounted on a fixed shaft by means of a sleeve 16 extending transversely of the frame of the register mechanism. The gear 15 is connected by means of an idler gear 16' with a second idler gear 17, which meshes with a gear 18, secured to a disk 19 rotatably mounted upon the tube 9. The ratio of the gearing thus far described is such that for each cent counted by the sorting and counting mechanism the disk 19 is advanced one-tenth of a rotation. A carry-over gear 20 is mounted within the units trip indicator wheel 8 so as to be advanced twice for each rotation of the disk 19; and by each advance, since it is in mesh with a gear 21 secured to the hub 22 of the units trip register wheel 8, said units trip register wheel is advanced one-tenth of a rotation for each advance of the carry-over wheel 20, and thus one fare is indicated for each five cents counted by the coin counting mechanism. The carry-over gear 20 is supported by the arm 23, mounted on a squared shaft 24, which may be oscillated so as to reset the trip register wheels to zero.

As shown in Fig. 5, the right hand end of the hub 22 of the units trip register wheel has rigidly secured thereto a locking disk 25, and a carrying tooth 25', which operates a second carry-over wheel 26, meshing with a gear 27, carried by the hub 28 of the tens trip register wheel to advance it each time the units trip register wheel has made a complete rotation.

Similar carry-over mechanism is provided between the tens trip register wheel and the hundreds trip register wheel.

Each of the trip register wheels is provided with a stop plate 29, which rotates during the advance of the trip register wheels outside of the flattened end extension 30 of the corresponding stud support for the carry-over gear operating the said trip register wheel. When the trip register wheels are reset to their initial position, the carry-over gears and their supporting studs are moved outward to disengage the carry-over gears from the gearing operating and operated by them, and this movement brings the flattened end 30 of each supporting stud into the path of the corresponding stop 29, so that all of the register wheels are thus positively brought back to their zero position, as a result of turning the resetting handle 31.

The resetting handle 31 is radially connected to a grooved collar 32 mounted upon the tube 9, so that it may be moved longitudinally thereon, but secured to the tube by a key 33, so that it is incapable of rotary motion relatively to the tube. The collar 32 engages pins 34 carried at the upper end of a lever 35, pivotally supported at 36, which lever is provided at its lower end with a cross rod 37, engaging the upper end of a bell crank lever 38, pivotally supported at 39 from the lower plate 40 of the framework of the fare indicating mechanism. The right hand end of the bell crank lever 38, as seen in Fig. 2, extends toward the center of the fare registering mechanism over the upper end of a rod 41, which is vertically movable in the column 2. This rod 41 is normally held in its upper position, and when it is moved downward by the operation of the bell crank lever 38 it serves to lock the coin counting and sorting mechanism in a manner to be described. A spring 42 is provided to hold the lever 35 in the position indicated in Fig. 2.

When it is desired to reset the register the resetting handle 31 is first pulled outward away from the trip registering wheels, which moves the upper end of the lever 35 outward from engagement with the stop 43. Rotation of the resetting handle 31, when in this position, in the direction indicated by the arrow in Figs. 4 and 13, moves the upper end of the lever 44 outward away from the tube 9 so as to bring the stop 43 under the lever 35 and prevent a return of the lever 35 to its normal position, until the resetting handle 31 has made a complete rotation. This movement of the lever 44 results from the engagement of the hook-shaped upper end of the lever with a cam notch 45 formed in the disk 46 keyed to the tube 9 just inside of the plate 47 of the framework of the fare registering mechanism. The lever 44 is secured to the end of the rock shaft 24 by means of a screw 48, so that the outward motion of the upper end of said lever rocks said shaft to move the carry-over wheels from engagement with their corresponding gears and at the same time brings the studs of said carry-over gears into the paths of the stops 29 of the trip registering wheels. A spring 49 is provided to return the lever 44 and the carry-over wheels 20 when the resetting operation is completed.

The tube 9 has located therein a sliding bar 50 supported in place by a cylindrical bar 51, grooved along one side to receive said bar, and from this bar at its left hand end a key 52 projects into engagement with a cam 53 supported by the side plate 54 of the framework of the register mechanism. The bar 50 also has projecting therefrom a key 55 for each of the trip register wheels; and as the tube 9 is rotated by rotation of the resetting handle 31, the beveled surface of the key 52, best shown in Fig. 10, engages the cam 53, thus moving the sliding bar 50 to the right, as seen in Fig. 5, bringing the keys 55 into the recesses 56 formed in the hubs of the trip register wheels; so that as the rotation of the tube 9 is continued, the keys 55 pick up the trip register wheels one after another by the engagement of each with a corresponding numeral projecting key 57, carried by the hub of the corresponding trip register wheel.

As a result of the construction described, when the tube 9 makes a complete rotation all of the actuated trip register wheels have been engaged by the corresponding keys 55 and advanced to their zero position, further rotation being prevented by engagement of the stops 29 with the ends 30 of the studs carrying the carry-over wheels. The ends of the keys 55 are beveled, as indicated in Fig. 10, and the ends of the keys 57 are beveled, as indicated in Fig. 9, so that when the trip register wheels are in zero position the keys 57 will not be engaged by the keys 55, as the beveled surfaces referred to permit the keys 55 to pass the keys 57 while the tube 9 is rotating sufficiently to move the sliding bar 50 by an engagement of said bar with the cam surface 53. This cam surface is so constructed as to hold the sliding bar to the right, as seen in Fig. 5, until the resetting handle 31 has made a complete rotation, at which time the key 52 is disengaged by the cam surface and the pressure of the resetting handle upon the right hand end of the sliding bar 50 moves it back to the left, as shown in Fig. 5, so that the keys 55 are out of the paths of the keys 57. The grooved collar 32 is provided with a notch 58 for engaging a spring latch 59 to prevent back rotation of the resetting tube 9.

Each of the carry-over wheels 20 is held in the proper position to reëngage the associated gears when removed from engagement with them by means of a dog 60 pivoted to the corresponding arm 23 at 61, a spring 62 being provided to press said dog into engagement with the carry-over gear to hold it in any position to which it may be moved.

A blind 63, supported by arm 64 from the tube 9 so that said blind may be oscillated relatively to the trip register wheels is provided for indicating when the resetting operation has been completed. The arm 64 is extended beyond the tube 9 in the form of a bell crank and to this is pivotally connected the upper end of a twisted link 66, the lower end of which, as more clearly shown in Fig. 12, is pivotally connected to a bell crank arm 35$^a$ extending from the lever 35 across the machine under the trip register wheels.

As a result of this construction, when the lever 35 is moved outward by the movement of the resetting operation, the blind 63 is moved downward between the trip register wheels and the sight opening 67, so as to indicate that the trip register is being reset; and at the end of the resetting operation, when the lever 35 moves back to its normal position, the blind again is raised clear of said sight opening 67.

To the left hand end of the tube 9, as seen in Fig. 5, is secured a skew gear 68, meshing with skew gear 69 secured to the rear end of a shaft 70, the front end of which has secured to it a crank 71, the crank pin 72 of which works in a slot 73 formed in a lever 74 pivotally mounted upon the frame of the machine at 75. The lower end of the lever 74 has pivotally connected thereto a link 76, the other end of which is pivotally connected at 77 with the direction indicator 78, which is slidably mounted upon a transverse rod 79 bearing the indications "In" and "Out" for indicating through the sight opening 80 the direction of the trip which is being made at any time.

The gear 15 is rotatably mounted upon a transverse sleeve 16, supported by the framework of the register mechanism, and upon the shaft supporting the sleeve 16 are mounted the total register wheels 82, the units wheel of which is rigidly secured to the gear 15. The gear 16', meshing with the gear 15, is rotatably mounted upon a transverse shaft 83, which also serves to support the carry-over gears 84 for advancing each total register wheel 82 of higher order when the wheel of next lower order has completed one rotation. The gear ratio between the units register wheel 82 and the operating mechanism of the coin sorting and counting mechanism is such that for each cent sorted and counted by said mechanism the total register is advanced one step, as a result of which the indication of the total register shows the amount of money sorted and counted by the coin sorting and counting mechanism.

The stud 12 rotatably supports a sleeve carrying the gears 9' and 13 and this sleeve has secured thereto a cam 85 which engages a roller 86 carried by the end of an arm 87, rigidly secured to a rock shaft 88. The upper end of the rock shaft 88 rigidly supports one end of a stiff spring 89, the other end of which has rigidly secured thereto a hammer 90 for striking the gong 91, mounted in the top of the casing of the registering mechanism. The relation between the cam 85, the arm 86 and the hammer 90 is such that when the roller 86 rests upon the lowermost portion of the cam the hammer is slightly removed from the gong 91, as a result of which when the cam passes under the roller 86 and permits the same to drop from the trailing edge of the cam, as the cam is rotated in the direction indicated by the arrow in Fig. 6 the inertia of the hammer 90 flexes the spring 89 sufficiently to impart a blow to the gong 91, after which the hammer 90 rebounds and remains clear of the gong so as not to interfere with its ringing. A push rod 92 is pivotally connected at its lower end, as seen in Fig. 6, to the arm 87, and has a shoulder formed thereon near its lower end for engaging the lower end of a spring 93, the upper end of which presses against one of the feet of the side plate 47, through an opening in which the rod 92 is permitted to freely pass. The lower end of the rod 92, as seen in Fig. 6, is extended at its pivotal connection so that when the arm 87 is released by the cam 85 the rod 92 is moved forcibly into engagement at its lower end with one of the feet of the side plate 54 and thus ample power is provided for striking the gong and at the same time the proportion of the parts is such that the pressure of the spring is not exerted upon the cam 85 until the said cam has been rotated sufficiently to move the rod 92 away from the side plate 54 of the framework of the register mechanism.

The gearing is so proportioned that the shaft 12 makes one complete rotation for each five cents sorted and counted by the coin sorting and counting mechanism, from which it at once appears that the gong 91 is rung each time a five cent fare is registered upon the trip registering wheels.

The framework of the registering mechanism consists of the side plates 47 and 54, supported by means of screws, as indicated, from the base plate 40. These side plates support at their upper ends a top plate 95, which is pushed upwardly at its central portion to provide a clearance for the trip registering wheels and the blind 63. This top plate 95 supports the gong 91, as indicated in Fig. 3. The top 96 of the casing of the registering mechanism is supported in place by a bracket 97, so bent that its ends are held in place upon the top plate 95 by means of screws 98, which hold the top plate to the side plates 47 and 54 and the top 96 is held to this bracket by a rivet connection at 99, as indicated in Fig. 3. The lower edge of the top 96 has formed around it a bead 100 extending outward beyond the edge of the top plate 95 a sufficient distance so that the side walls of the casing when in place pass up into the bead, thus protecting the upper edge of the side walls of the casing.

The side walls 101 and bottom of the casing 102 constitute an integral structure, which may be removed from the framework of the registering mechanism by passing this part of the casing downward over the column 2 and off from its lower end, when desired. The bottom 102 is provided with two upwardly extending studs 103 and 104, as seen in Fig. 6, which pass upward through the bottom plate 40 of the framework of the registering mechanism, and these studs have notches formed on their inner sides for engaging the ends of a double locking lever 105 supported in an opening formed therefor in the bottom plate 94. The locking lever 105 is rigidly connected at its central portion to a collar 106 mounted in the upper end of the column 2, which collar is in turn rigidly secured to the upper end of a tube 107, passing downward through the column 2 to be rotated at its lower end to lock the casing of the registering mechanism in place. The ends of the locking lever 105 are beveled to facilitate engagement with the notches formed in the posts 103 and 104, and the collar 106 and the tube 107 may be oscillated freely relatively to the column 2 and also relatively to the tube 10, which is rigidly connected with the gear 9' for driving the same.

Column 2 at its lower end, as indicated in Fig. 14, has secured thereto a collar 108 provided with downwardly extending keys 109, as shown in Fig. 15, which downwardly extending keys engage corresponding keyways formed in the upper edge of the central hub 110 of the spider 111, secured by nuts 112 to the upper ends of the corner rods 113 of the frame work of the coin sorting and counting mechanism for the purpose of supporting the column 2 and parts carried thereby in proper position above the coin sorting and counting mechanism.

The framework of the coin sorting and counting mechanism is supported by a bottom plate 114, an intermediate plate 115 and a top plate 116, the plates 114 and 115 being properly secured together by means of the corner rods 117, while the plates 115 and 116 are similarly secured together by the corner sleeves 118. The mechanism located between the plates 114 and 115 is employed for the purpose of sorting and counting the coins, while the mechanism between the plates 115 and 116 consists of gearing for transmitting the proper amount of motion from the operating shaft to the registering mechanism above described to correspond with the value of the coins sorted and counted.

The coins which are to be sorted and counted are deposited in a hopper 118, supported by the top of the casing 119, in convenient position for receiving said coins. This hopper consists in a general way of a cylindrical tube 120 of glass, resting upon a bottom support 121 and held in place by posts 122 extending from said support to a retaining ring 123 engaging the upper end of the glass tube. The ring 123 supports within the tube a funnel-shaped member 124, which, as shown in Fig. 14, directs the coins to the left and then to the right to the delivery end 125 of said funnel-shaped member, from which the deposited coins fall upon trap doors 126, provided below the lower end of the tube 120 and sufficiently to the left of the opening 125 so that the coins can not readily be shaken from the machine if it is inverted before dumping the coins from the trap doors 126. A swinging guard 127 is pivotally mounted at 128 in the funnel 124 to close the opening in the finger through which the deposited coins pass when the hopper is inverted.

As a means for providing a telltale to indicate any attempt on the part of the operator of the device to extract the coins therefrom instead of dumping them from the trap doors 126 by inverting the machine, a comb of thin spring metal 129, is provided around the outside of the funnel 124, the fingers of said comb pressing out lightly against the inner surface of the glass tube 120, so that any coin which lodges between the outer surface of the finger and the upper end of the glass tube when the hopper is inverted will be retained in that position by the spring fingers of the comb. The particular construction of the hopper is not claimed in the present application, as it forms the subject matter of one of my copending applications, and this hopper is therefore not shown in the present case in all of the detail characterizing it. It is sufficient for the present consideration that the hopper provides a ready means for receiving the coins to be counted and sorted so that the deposited coins will pass readily to a position upon the trap doors 126 in which they may be observed through the glass tube 120 by the operator so as to check the depositor and determine whether a proper coin or coins have been deposited for the required fare.

Figure 31:
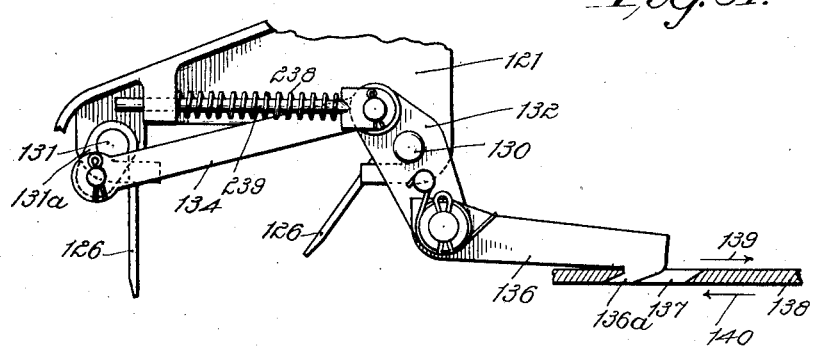
Fig. 31 is a detailed view of the devices employed for opening the trap forming the bottom of the coin receiving hopper.

The trap doors 126 are readily secured at their outer edges, as indicated in Fig. 14, to oscillatory rods 130 and 131, which rods are mounted on the under side of the top of the casing 119. The rod 130 has secured to its far end, as seen in Fig. 14, a double lever 132, and the rod 131 has secured to its far end, as shown in said figure, a crank 131$^a$, the latter crank being connected to the upper end of the crank 132 by a connecting link 134, so that when the crank 132 is operated both of the rods 130 and 131 are oscillated so as to move the trap doors 126 downward and thus dump the coins deposited upon them into the upper end of the coin receiving chute 135. The lower end of the crank 132 has pivotally connected thereto an operating link 136, which, as is more clearly shown in Fig. 31, is provided at its outer end on its under surface with a hook 136$^a$ for engaging a hole 137 in the disk 138 when the disk is moved in the direction of the arrow 139 in Fig. 31, in a manner to be explained. The normal direction of motion of the disk 138 when the operating shaft is moved to sort and count the coins is in the direction of the arrow 140.

The coins deposited in the chute 135 pass downward into a coin pan 141 mounted in an inclined position upon a supporting plate 142 by studs 143 from a second similarly inclined plate 144, which is supported by the bottom plate 114 and secured thereto by suitable screws 145, as indicated in Fig. 18. The upper edge of the plate 142 is supported by one of the corner rods 117 and the upper edge of the plate 144 is supported from the plate 115 by means of a stud 146 and screw 147, as indicated in Fig. 17.

Figure 21:
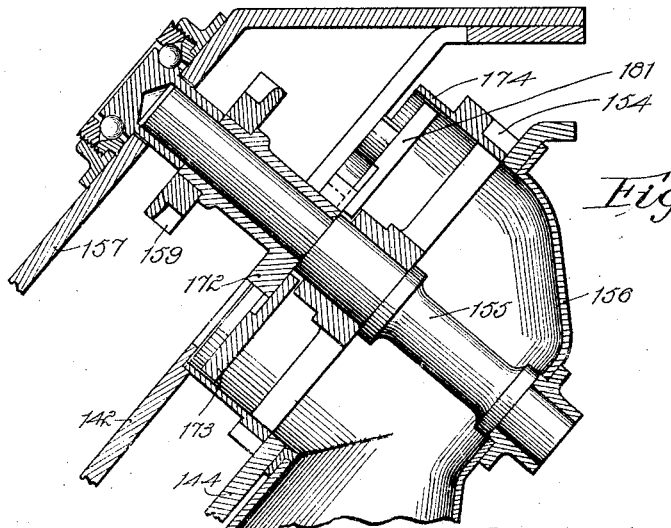
Fig. 21 is a vertical sectional view of the parts shown in Fig. 20 taken through the center of the sorting devices.
Figure 33:
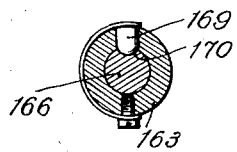
Fig. 33 is a sectional view of the operating shaft shown in Fig. 32, taken along the line 33—33.
Figure 30:
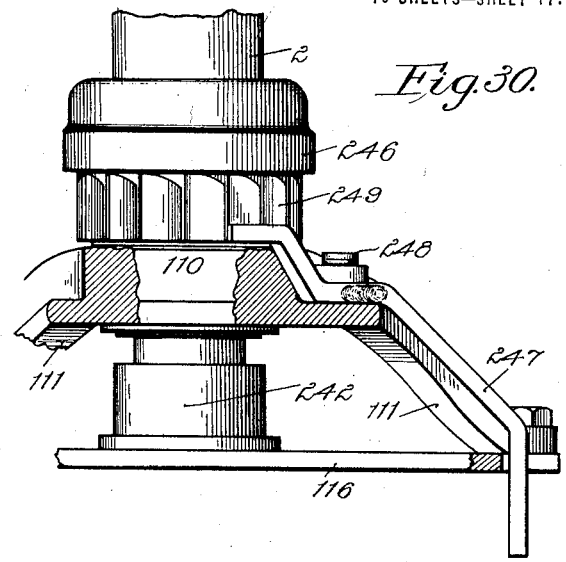
Fig. 30 is a detailed view of the mechanism employed in connection with the lower end of the connecting column for securing the column to the coin sorting mechanism.

The coin pan 141 has rigidly secured to its bottom and centrally disposed relatively thereto and extending downwardly a stud 148, supported by ball bearings, as indicated in Fig. 18 from the plate 144. The bottom of the coin pan 141 has rigidly secured thereto around the upper end of the stud 148 a spur gear 149 which meshes with a second spur gear 150 supported by the stud extending downwardly from the under surface of the plate 142. The gear 150 meshes with a pinion 151 rigidly secured by a sleeve to a mutilated gear 153 and rotatably mounted on a shaft 152, which gear 153 is rotated by a mutilated gear 154 secured to a shaft 155 centrally disposed in the coin sorting mechanism, as more clearly indicated in Figs. 23 and 21. The shaft 155 is supported at its lower end in the bearing carried by the chute 156 provided to receive the coins after they are sorted and counted, and the upper end of said shaft is supported by ball bearings carried by the plate 157, supported immediately above the coin pan 141 by the studs 158 from the plate 142. The shaft 155 carries near its upper end a skew gear 159, meshing with a corresponding skew gear 160. The gear 160 has rigidly secured to it another skew gear 161, which meshes with a corresponding skew gear 162, rigidly secured upon the operating shaft 163. This operating shaft 163 is supported by brackets 164 and 165 on the under side of the plate 115, so that said operating shaft occupies a substantially horizontal position. The shaft 163 is hollow so as to receive the rod 166, rigidly secured to the crank 4 by which the operating shaft 163 is rotated. The outer end of the shaft 163 has rigidly secured thereto a collar 168, having a semicircular recess formed therein around the bore of the shaft to receive a corresponding extension carried by the crank 4, by which relative rotation between the shaft and the crank is prevented. The crank is held in operative position in the shaft 163 by means of a spring pin 169, which enters a corresponding recess 170 in the crank 166, as more clearly indicated in Fig. 33. The right hand end of the shaft 163, as shown in Fig. 32, has formed thereon a beveled thread 171 for a purpose to be described.

The shaft 155 has rigidly secured thereto a measuring cam 172, having projecting points extending different distances from the center of the shaft, and said measuring cam extends above the surface of a fixed plate 173 provided for the purpose of receiving and supporting the coins during the sorting operation. The cam 172 extends downward into a shallow recess formed in the upper surface of said plate 173 and is constructed so as to engage the various coins between the several points 172$^a$, 172$^b$ and 172$^c$ and the inner surface of the cylindrical shell 174 rigidly secured to the gear 154 when the cam 172 and the gear 154 are rotated.

Figure 20:
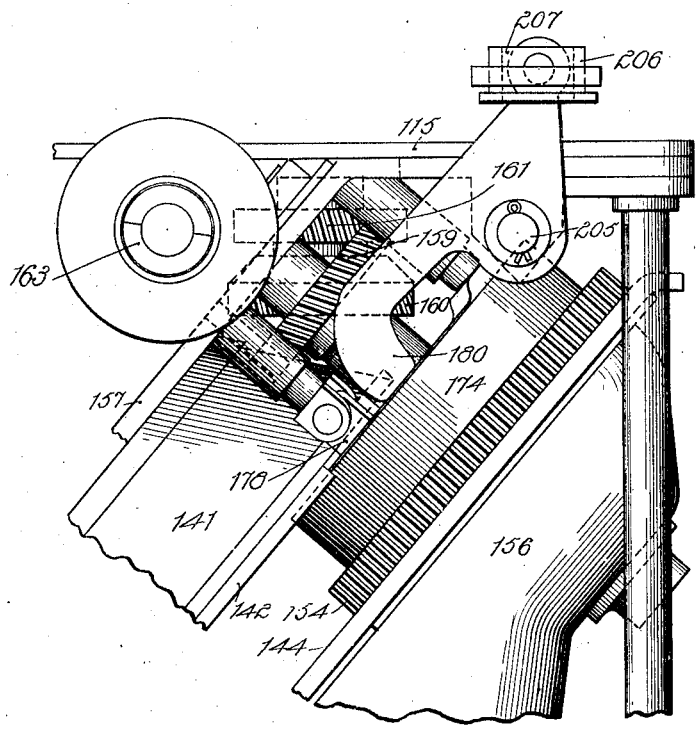
Fig. 20 is a left hand side view of the sorting and counting mechanism shown in Fig. 17.

As a result of the construction described, when coins are deposited in the coin pan 141 through the chute 135, the operating shaft 163 is rotated by means of the crank 4, the coin pan 141 is rotated in the direction indicated by the arrow in Fig. 22, and the coins are engaged one after another by the edges of the openings 141$^a$ through the bottom of the coin pan and moved with the pan upon the plate 142 in the direction shown by the arrow in Fig. 22 upward and under to the wiper 175, which is supported in the position indicated by means of a stud 176 and held down against the surface of the coin pan 141 by means of a spring 177, as shown more clearly in Figs. 19 and 22. The wiper 175 serves to prevent more than one coin remaining in one of the openings 141$^a$ as said opening approaches the point of discharging the coins into the coin sorting mechanism, and thus prevents delivering the coins to the coin sorting mechanism more than one at a time. At said delivery point the plate 142 is cut away to permit the coins to drop from the coin pan 141 upon the plate 173 in the path of the projecting points 172$^a$, 172$^b$ and 172$^c$ of the measuring cam, so that each coin of different size will be picked up at the right time by this measuring cam and moved on the plate 173 under the wiper 178, which is provided with a rectangular opening 179 passing through it to receive the counting finger 180 shown in Fig. 20. The end of the wiper 178 is conformed as indicated in Figs. 24 and 25 so as to turn the coin downward through the delivery opening 181 from the sorting and counting mechanism into the chute 156. The shape of this wiper serves to positively move the coin from the sorting mechanism so that the coins will not clog even when the mechanism is operated at high speed. The wiper 178 is supported from the plate 157 by means of spring plungers, as indicated in Fig. 25.

As a result of the construction of the mutilated gears 153 and 154 the motion of the coin pan 141 is intermittent for a continuous motion of the shaft 153 and the operating shaft 163. This provides for a short interval of delay at the time that each of the openings 141$^a$ through the bottom of the coin pan comes opposite the delivery opening through the plate 142. The sleeve carrying the pinion 151 and gear 153 has rigidly secured thereto an arm 182 to be engaged by the shoulder 154$^a$ on the gear 154 so as to cause the proper engagement between the teeth of the gears 153 and 154, when the delay surface on the gear 154 has passed the teeth on the gear 153.

The coin pan 141 is provided with an upturned edge 141$^b$, as shown more clearly in Fig. 19, and in this upturned edge there are formed between the openings 141$^a$ a number of humps 141$^c$ which serve as the pan is rotated to tip the coins over which may lie against the inner surface of the upturned edge and cause them to lie flat on the bottom of the pan. The trailing edges of the openings 141$^a$ are preferably made somewhat thinner than the thinnest coin to be handled by the mechanism, so as to prevent the engagement by each opening of more than one coin at a time. Openings 141$^d$ are provided through the upturned flange 141$^b$ to permit small foreign articles and dirt to drop from the coin pan, if for any reason they find their way into said pan. It is to be noted that the direction of motion of the coin pan and the measuring cam is as indicated by the arrows in Fig. 22, and therefore the motion of the coin is continuous without a reversal of direction as it passes from the coin pan through the sorter mechanism. This affords a more rapid and advantageous operation than could be secured if it were necessary to reverse the direction of motion of the coin as it left the coin pan.

The coins delivered into the delivery chute 156 pass downward in said chute under the movable bottom 6 of said chute, which bottom may be moved downward by engagement of the hand with the bent member 7 when it is desired to remove the money from the chute 156. A spring 183 is provided, which coöperates with the rod 184 pivoted to the upper end of a crank 185 at 186 to keep the bottom 6 of the chute 156 in the horizontal position, closing the chute as the crank 185 is rigidly secured to said bottom 6.

The gear 161 is rigidly secured to the lower end of a hollow shaft 187, to which there is secured above the plate 115 a double cam 188. The upper end of the shaft 187 is provided with keyways which engage corresponding keys carried by the upper end of a sleeve 189 surrounding the upper portion of the shaft 187. The lower end of the sleeve 189 is provided with a keyway which is engaged by a corresponding key carried by a cam disk 190. The sleeve 189 has surrounding it and freely rotatable relatively thereto a sleeve 191 to which there is rigidly secured a locking wheel 192. The upper end of the sleeve 191 is provided with keyways 191ª for receiving corresponding keys 193 extending from a collar 194 rigidly secured to the lower end of the tube 10, as more clearly shown in Fig. 14.

From the construction above described it will be understood that when the sleeve or tube 191 is rotated with the column 2 in place the registering mechanism is actuated an amount depending upon the amount of rotation communicated to the tube 191 from the operating shaft.

The shaft 187 has rotatably mounted thereon below the cam disk 190 a locking wheel 195. The wheel 195 has rigidly secured thereto a gear 196 and the tube or sleeve 191 has rigidly connected with its lower end a gear 197. Gears 196 and 197 are connected by pinions 198 rotatably mounted upon the cam disk 190, one of these pinions engaging the gear 196 and the other of said pinions engaging the gear 197 and together with it constituting a differential gear arrangement.

As a result of the construction just described it will appear that when the locking wheel 192 is held and the locking wheel 195 is released and the shaft 187 is rotated that the cam disk 190 and the locking wheel 195 are freely rotated, the wheel 195 at this time being rotated around the shaft 187. When, on the other hand, the locking wheel 195 is held and the locking wheel 192 is released, the sleeve 191 is driven by the rotation of the sleeve 187 and therefore the registering mechanism connected as above described with said sleeve 191 is actuated.

The devices employed for controlling the operation of the sleeve 191 are shown more clearly in Figs. 26 to 29, inclusive, to which reference is made.

The locking wheels 192 and 195 are arranged to be engaged by locking dogs 199 and 200, respectively. These locking dogs are rigidly secured together and mounted upon an oscillatory shaft 201, having end bearings supported in the plates 115 and 116.

The locking dog 200 has pivotally mounted upon it at 202 an oscillating lever 203, which has mounted on its lower side rollers 204 upon either side of the upwardly extending outer member of the cam 188, which constitutes the driving device of the coin counting mechanism. The free end of the lever 203 is connected with the upper end of the counting finger 180 by means of a universal joint connection which permits freedom of movement of the lever relatively to the counting finger, although the latter is pivotally supported upon a stud 205 from the plate 115 in a substantially vertical plane, while the lever 203 moves in a substantially horizontal plane. To accomplish this, the pivotal connection 206 between the counting finger 180 and the lever 203 is mounted in a ring 207, which may rotate and move the vertical free end of the lever 203. The outer cam surface 188 is so conformed that as the cam is rotated the lever 203 is moved back and forth upon its pivot, thus oscillating the counting finger 180 upon its pivotal support and causing the lower end of said counting finger to move through the opening 179 and into the opening 208 in the plate 173 immediately below the opening 179 if no coin is in the sorting mechanism, or against the coin, as indicated in Fig. 25, if a coin is in the sorting mechanism.

When the counting finger 180 strikes a coin in the sorting mechanism, as indicated in Fig. 25, the relation between the ends of the lever 203 is reversed and the pivotal connection 206 becomes the pivot of the lever, while the connection 202 becomes the operating end of the lever, motion of which serves to bring the dog 199 out of engagement with the locking wheel 192 and to bring the dog 200 into locking engagement with the locking wheel 195. The locking dog 200 is provided with a spring pawl 209 for permitting the locking wheel 195 to engage the locking dog 200 as the wheel rotates and for preventing back rotation of said locking wheel 195 after the locking dog 200 has been moved to a proper position to engage it. The locking dog 200 has extending therefrom an arm 210, provided with a downwardly extending lug 211 for engaging the upwardly extending rims 188$^a$ and 188$^b$ of the cam 188, for the purpose of holding the locking dogs in their position, releasing the locking wheel 192 and engaging the locking wheel 195 for sufficient lengths of time to cause the proper actuation of the register mechanism. It will be observed that the cam 188 has three separate operating portions, which, for the particular construction herein shown and described, correspond to the following coins: The portion 188$^c$ to one cent, the portion 188$^d$ to five cents, and the portion 188$^e$ to ten cents. The cams 188$^a$ and 188$^b$ are so proportioned and placed relatively to the cam surfaces 188$^c$, 188$^d$ and 188$^e$ that the lever 203 is actuated for the ten cent registration just before the lug 211 passes inside of the cam surface 188$^a$, which action, by means of the relation of the gearing above described, takes place at just the instant that the ten cent lug on the measuring cam 172 has placed a ten cent piece under the opening 179, if such a coin is in the sorting mechanism. Assuming the presence of such a coin, lug 211 is at once moved outward so as to pass on the outside of the cam surface 188$^a$, which surface serves to hold the lug and therefore the two locking dogs in their operated position until the registering mechanism has been sufficiently actuated to add ten cents to the total register and two fares to the trip register, at which time the trailing edge of the cam surface 188$^a$ disengages the lug 211 and permits the spring 212 connected by the rod 213 to the upper end of the locking dog 200 to move the locking dog 199 into engagement with the locking wheel 192 and to release the locking wheel 195 from engagement with the locking dog 200, thus at once stopping further actuation of the registering mechanism.

A similar operation takes place when the lever 203 is actuated by the cam surface 188$^d$, the only difference being that the lug 211 is then actuated by the cam surface 188$^b$, which, it will be noticed, is of shorter length than the cam surface 188$^a$ and causes such an actuation of the registering mechanism as will increase the indication of the total register by five cents and advance the trip register one fare. No locking cam is provided for the one cent piece, as the length of time required during which the locking wheel 192 must be disengaged and the locking wheel 195 engaged is so short as to make it both unnecessary and undesirable to have a special cam surface for engaging the lug 211 for this operation. A clearance opening is provided between the cams 188$^a$ and 188$^b$ to permit the lug 211 to pass from the inside of the cam to the outside at the proper instant, and the return movement of the lug 211 and the parts carried thereby is caused to take place positively if for any reason the spring 212 does not act with sufficient rapidity by the engagement of the outer cam surface of the cam disk 190 with the roller 214 carried on the pivot 202 of the pawl 209 and lever 203.

Figure 26:
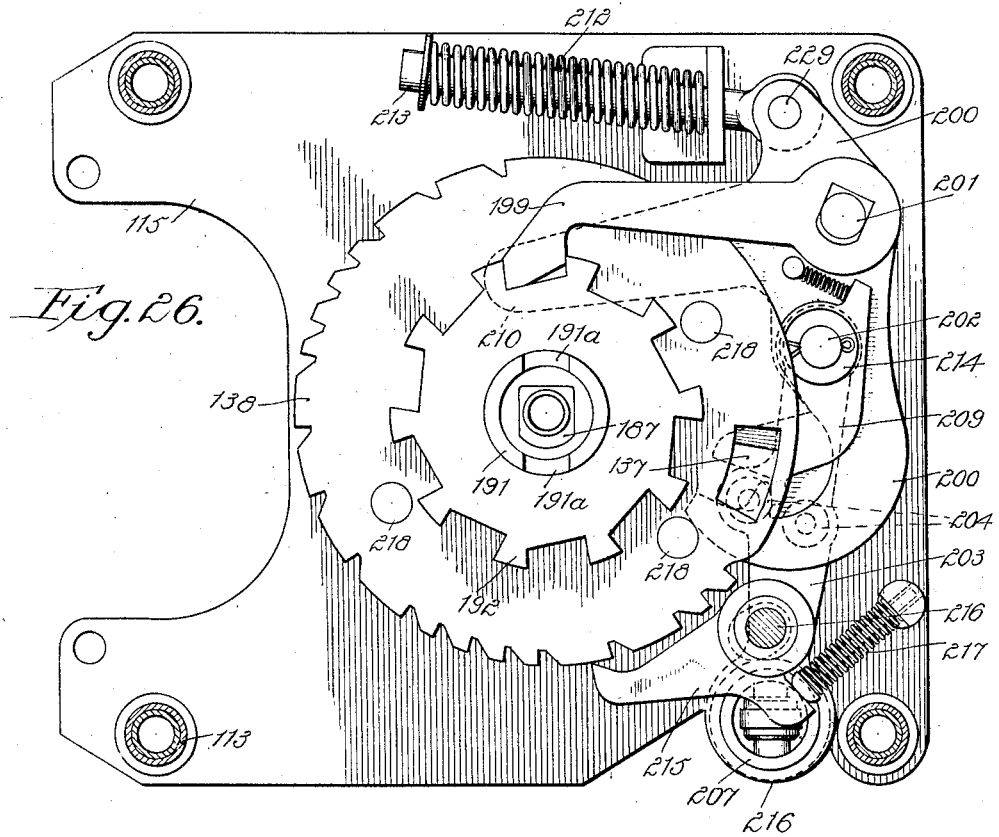
Fig. 26 is a top view of the parts shown in Fig. 18, with the top plate and coin receiving devices removed.
Figure 27:
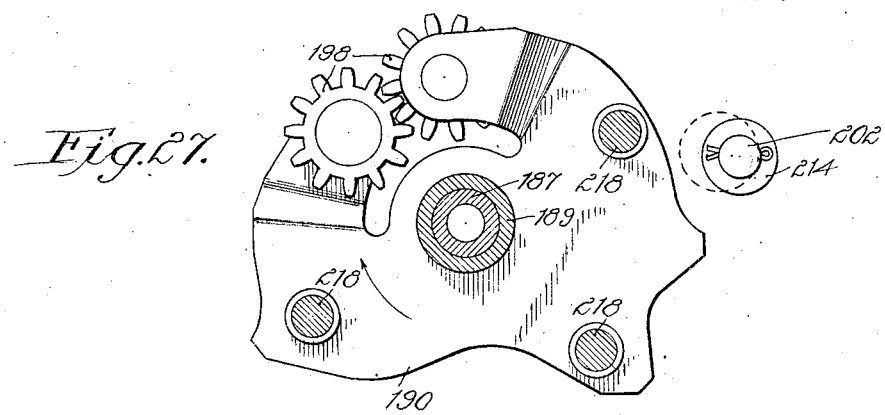
Fig. 27 is a sectional view of the parts shown in Fig. 19, taken along the line 27—27.
Figure 28:
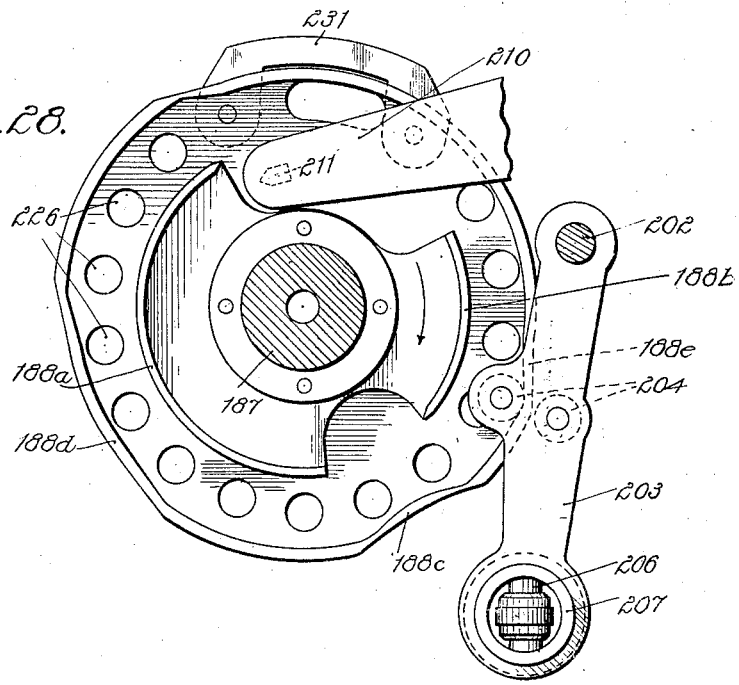
Fig. 28 is a sectional view of the parts shown in Fig. 19 taken along the line 28—28.
Figure 29:
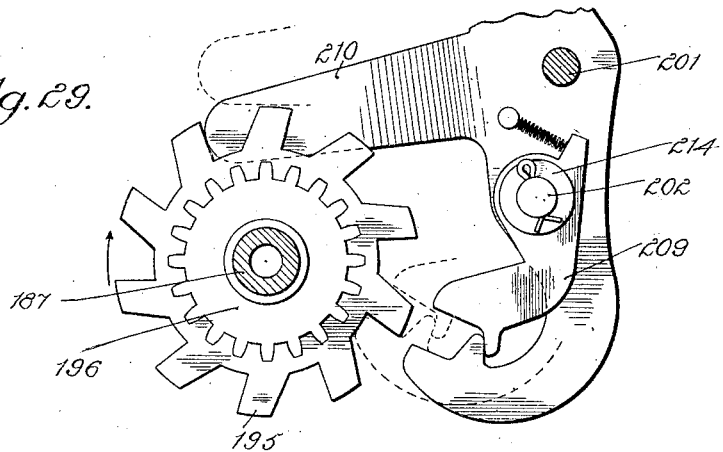
Fig. 29 is a sectional view of the parts shown in Fig. 18, taken along the line 29—29.

The cam disk 190 has rigidly secured thereto above the gear 197 the disk 138 by studs 218, as indicated in Fig. 26, and this disk 138 has on its circular edge a plurality of notches engaged by the holding pawl 215 pivotally supported at 216 from the under side of the top plate 116 and held in engaging position by a spring 217.

From the description just given of the mechanism contained between the plates 115 and 116, it will be understood that the counting finger 180 is actuated once for each coin that can by any possibility be brought to the counting point immediately below the counting finger by the measuring cam 172, and, furthermore, that each counting movement of the counting finger occurs at precisely the instant when the measuring cam has brought the corresponding coin under the counting finger. Thus, if a one cent piece is under the counting finger at the instant that it is moved downward the dead relation between the locking dogs and the locking wheels continues only for a sufficient interval to advance the registering mechanism one cent. Again, if the downward movement of the counting finger takes place at the instant that the five cent piece is in counting position under the counting finger, the dead relation between the locking dogs and the locking wheels is caused to continue for a sufficient interval relatively to the motion of the operating shaft to advance the registering mechanism five cents or one fare, as the case may be. And again, if a ten cent piece is in counting position under the counting finger at the instant that the counting finger is moved downward, the dead relation between the locking dogs and the locking wheels is caused to continue for such an interval relatively to the motion of the operating shaft as will advance the registering mechanism ten cents or two fares, as the case may be. In other words, a complete cycle of operation of the sorting and counting mechanism provides a definite place in the cycle for each different coin sorted and counted by the mechanism, and the cycle furthermore includes a counting mechanism which has a series of distinct and characteristic operations which are completed in the scale, these operations being of different value and corresponding to the different coins sorted.

A system of interlocks is provided in connection with the mechanism above described so that it is impossible to reset the registering mechanism when there are any coins in the coin pan or sorting mechanism, and this is accomplished by the use of devices requiring five complete turns of the operating shaft after the last coin is sorted and counted and after each opening of the trap doors 126 before the resetting lock is moved to its clear position. Furthermore, the resetting operation prevents rotation of the actuating shaft until the resetting has been completed.

The devices for accomplishing this result will be best understood by reference to Figs. 32, 34 and 35. As shown in these figures, the rod 41, which extends through the column 2, extends downward so that its lower end is practically even with the lower end of the tube 187, when the upper end of said rod 41 is in a position corresponding to the normal position of the lever 35, or, in other words, the position of such lever for operating the registering mechanism. A bracket 219 is secured to the under side of the plate 115, adjacent to the gears 160 and 161, and supports the pivot 220 of a lever 221, the right hand end of which, as seen in Fig. 34, is disposed below the lower end of the rod 41. The left hand end of said lever has resting upon it the lower end of a tube 222, containing a plunger 223, which normally extends into the plate 115 but not above its upper surface. When the rod 41 is moved downward the tube 222 is moved upward and the spring 224 surrounding said tube is compressed, as is the spring 225 contained within the tube under the lower end of the plunger 223. If one of the holes 226 in the cam 188 is above the plunger 223 at this time, the plunger 223 is raised by the spring 225 and enters said hole 226, thus locking the cam 188 and all of the gearing connected with the operating shaft against actuation. If, however, at this time one of the holes 226 is not in alinement with the plunger 223 and it is attempted to rotate the operating shaft, one of said holes is immediately brought into alinement with the plunger 223, at which time the spring 225 at once forces the plunger upward and into engagement with the cam 188 to prevent its further motion. The bracket 219 has extending from its left hand edge, as indicated in Fig. 34, a slotted arm 227, in which the upper end of the lever 228, as seen in Fig. 32, may move back and forth. This lever 228 is pivotally mounted upon a stud 229. The upper end of the lever 228 is beveled, as indicated, to engage the beveled screw 171 when the lever is in its uppermost position under the action of the spring 230, which normally holds it up in engagement with the screw 171 and also tends to move the upper end of the lever to the left, as seen in Fig. 32. With the lever in its left hand position it is impossible to reset the registering mechanism, for the lever 221 is provided adjacent the locking plunger 223 with an upturned flange 221$^a$ which is adjacent to the under side of the lever 228 when it is in its left hand position, as indicated in Fig. 32, and thus motion of the lever 221 is prevented, and as a result it is impossible for the rod 41 to be moved downward until the lever 228 is moved to the right and out of the path of the lever 221. The spring 224, which presses against the left hand end of the lever 221, as shown in Fig. 34, is of sufficient strength to support the weight of the rod 41 and hold it in its upper position when the registering mechanism is in condition to be actuated. The motion to the right of the lever 228 is accomplished by means of the beveled thread 171 and to completely move the lever from the path of the lever 221 it is necessary to give the operating shaft five complete turns in the direction required to actuate the sorting and counting mechanism. If, however, during these five complete turns a coin passes through the sorting mechanism, the lever 228 is tripped as follows: The pivotal connection between the rod 213 and the upper end of the lever 200 is the pivotal support 229 of the lever 228. This is so disposed that when the lever 200 is moved to change the locking relation of the locking dogs 199 and 200 the pivot 229 is moved away from the operating shaft 163 sufficiently to disengage the upper end of the lever 228 from the beveled thread 171 for which condition the spring 230 at once throws the lever 228 to the left, as seen in Fig. 32. Thus, after counting each coin, five complete turns of the operating shaft are required to move the lever 228 to a position to permit resetting the registering mechanism. Again, if it is attempted to reset the registering mechanism immediately after depositing coins in the coin pan by opening the trap door 126, this is prevented as follows: The cam 188 has secured thereto an auxiliary cam 231, which engages a spring latch 232 pivoted at 233 to a lever 234, mounted upon a fixed pivot 235. When the cam 188 is moved in the direction of the arrow 236, which is the direction of motion for registering the coins, the latch 232 yields and permits the passage of the cam 231 without actuating the lever 234. When, however, the cam 188 is moved in the direction of the arrow 237 to open the trap doors 126, the cam 231 engages the latch 232 in a manner to force the lever 234 downward, as seen in Fig. 32, and as the right hand end of the lever 234 rests upon a hub 228ᵃ this motion moves the lever 228 downward upon its pivot 229, thus disengaging the upper end of the lever from the beveled thread 171. The opening at the lower end of the lever 228 around the pivot 229 is enlarged longitudinally of the lever a sufficient amount to permit this motion of the lever relatively to its pivot.

From this it follows that after a coin has been deposited in the coin pan it is necessary to give the operating shaft five complete rotations to clear the resetting mechanism. As it is certain that the coin will be picked up and transferred to the coin sorter during these five rotations, it is apparent that the locking lever 228 will again be returned to its left hand position, as seen in Fig. 32, by the sorting and registering of the coin, from which it follows that it is quite impossible for there to be any coins in the coin pan or in the sorting mechanism when the resetting devices of the registering mechanism are operated. It is to be understood that while I have shown and described mechanism requiring five complete turns of the operating shaft to clear the resetting mechanism so that it may be actuated, any other number of turns may be employed, as desired, for accomplishing this result, by differently constructing the beveled thread 171.

While, as indicated in Fig. 26, the disk 138 is provided with but one opening 137 for engaging the latch 136 to open the trap doors 126, if desired, more of these openings may be provided and they may be placed at any desired point or points on or in the disk 138. The arrangement of the trap door operating devices is shown more clearly in Fig. 31, in which figure a spring 238 is provided, which, by means of a rod 239 exerts a thrust upon the upper end of the double lever 132 so as to normally hold the trap doors 126 in horizontal position. The edges of the opening 137 in the disk 138 are beveled, as indicated, so that the disk will not engage the latch 136 when rotated in a direction to operate the coin sorting and counting and the registering mechanism.

Provision is made for holding the entire casing of the machine in place and for preventing access to the holding devices by means of a single seal as follows: The top 96 of the casing of the register mechanism is held in place as described by the screws 98, which are contained within the casing 101, when the latter is in place around the registering mechanism. The side walls 101 of the casing of the registering mechanism are held in place by upwardly extending studs 103, engaging the double lever 105 as above described. When the column 2 is in position in the supporting spider 111, tubing 107 is prevented from rotating by the engagement of keys 240 secured to its lower end with corresponding notches 241 formed in the upper end of the sleeve 242 secured to and extending upwardly from the top plate 116 of the coin sorting and counting mechanism. The lower section 243 of the casing of the coin sorting and counting mechanism is held in place by means of screws 244 engaging bent lugs 245 secured to the upper end of said portion of the casing, and when this is secured in place the upper portion 119 of the casing of the coin sorting and counting mechanism is put in place over the said screws 244, completing the casing of the said coin sorting and counting mechanism. The casing 119 must be put in place before the column 2 is inserted into the spider 111, and in placing the portion 119 of the casing in position care must be taken that the latch 136 rests in the proper position upon the top of the disk 138. After the column 2 has been inserted into the hub of the spider 111, rotation of the column is prevented by the engagement of the keys 109 extending from the collar 108, engaging corresponding notches in the upper end of the hub 110 of the spider 111, and then the internally threaded sleeve 246 surrounding the column 2 and engaging the upper end of the collar 108 is screwed upon the externally threaded upper end of the hub 110. The threaded sleeve 246 is screwed down until it firmly clamps the collar 108 against the hub 110 and is retained in this position by means of a spring latch 247, pivotally supported at 248 from the spider 111 which engages ratchet teeth 249 formed on the outer cylindrical surface of the lower end of the sleeve 246. In this way back rotation of the sleeve 246 is prevented. The lower end of the spring latch 247 extends downward and terminates in a free end, which is disposed just inside of the casing 119 and below the plate 116, just inside of the small glass window 250. In this manner the entire casing is held securely closed, unless the sealing window 250 is broken or until the spring latch 247 is moved out of engagement with the ratchet teeth 249 on the threaded sleeve 246. The column 2 can not be removed from the lower portion of the machine and therefore no part of the casing can be taken off from the machine.

Figure 37:
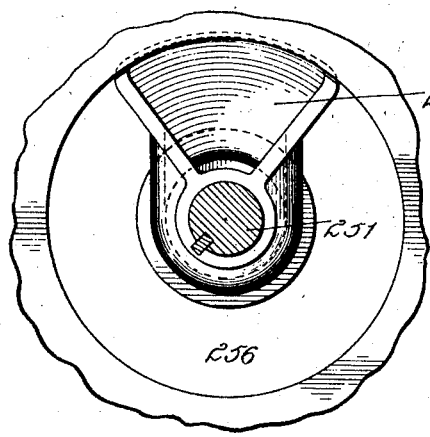
Fig. 37 is a sectional view of parts shown in Fig. 36, taken along line 37—37.
Figure 36:
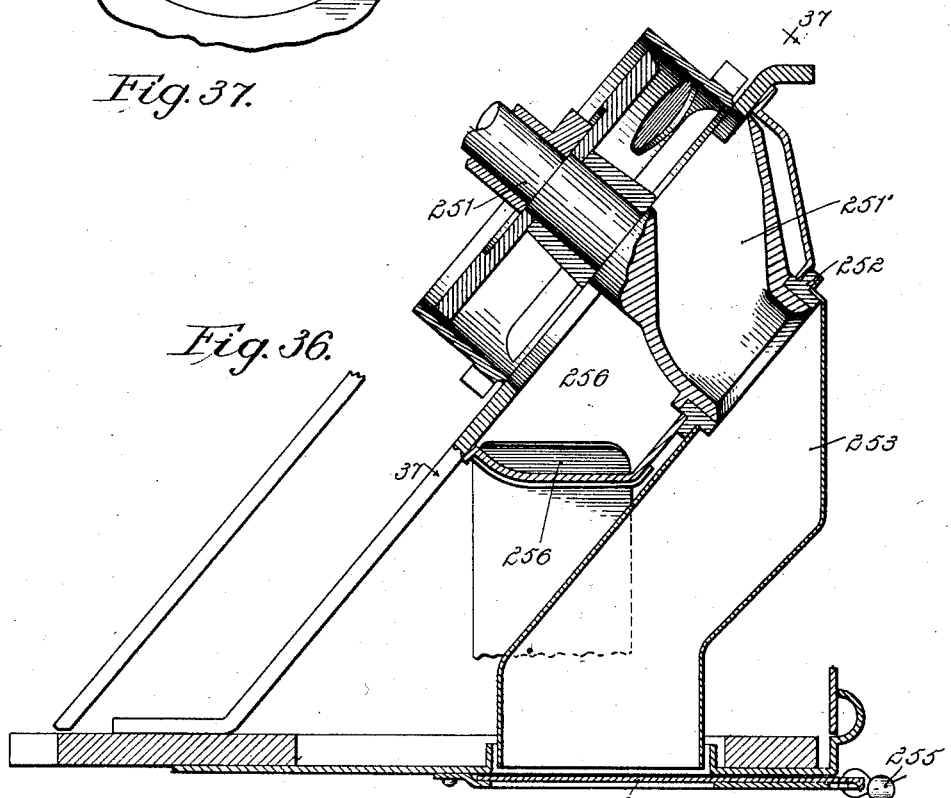
Fig. 36 shows in vertical sectional view a modified form of coin sorting mechanism for delivering coins of different value to different receptacles.

In the modified structure shown in Figs. 36 and 37 the shaft 251, which supports and operates the coin sorting device, has secured to its lower end a coin tube 251', which is offset at its upper end so as to lie entirely to one side of the shaft 251, and sufficiently inclined as it progresses downwardly so that at its lower end it is concentric with the shaft 250 and is rotatably supported at said lower end in a bearing formed in a collar 252 in the upper end of a delivery chute 253. The delivery chute 253 is closed at its lower end by a slide 254, which may be held in place, if desired, by means of a seal 255, and thus all of the coins so delivered to the chute 253 may be retained in the machine. The measuring cam employed in connection with this modification is the same as that shown and described above, and the only difference in the operation of the device is that the coin chute 251' is so disposed angularly relatively to the measuring cam that it is immediately below the delivery opening from the sorting mechanism when coins of the desired size are delivered through the delivery opening of the coin sorting mechanism, and thus provision is made for receiving in the coin chute 253 coins of special kind, as, for example, pennies. Coins delivered to the delivery opening of the sorting mechanism at any other time are therefore of other size than the particular coins to be delivered into the chute 251', and as these other coins are delivered when the chute 251' is not below the delivery opening said other coins fall into a second delivery chute 256, by which they are delivered on to a movable chute bottom or trap door in the same manner as described above.

It is apparent that by modifying the construction of the enlarged lower end of the shaft 250 shown in Figs. 36 and 37 several coin chutes might be provided in said lower end of the shaft for the purpose of separately collecting all of the different kinds of coins sorted.

Figure 38:
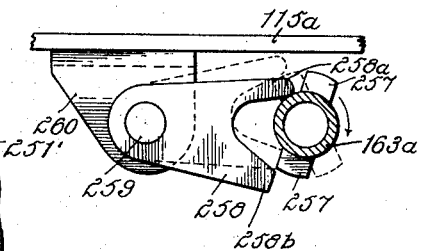
Fig. 38 is a detailed view of governing mechanism employed for preventing too rapid operation of the operating shaft of the machine.

For some conditions it is desirable to prevent the too rapid rotation of the operating shaft, and in order to accomplish this result use may be made of the devices shown in Fig. 38. As shown in this figure, the operating shaft 163ª is provided with two oppositely disposed lugs 257, which alternately engage a latch 258, pivotally supported at 259 to a bracket 260 secured to the under side of the main plate 115ª of the sorting and counting mechanism. The latch 258 is bifurcated at its right hand end, as shown in Fig. 38 and so conformed that the upper one of the split end portions 258ª rests upon the upper surface of the operating shaft 163ª, while the lower one of said split end portions 258ᵇ just clears the end of the lug 257, which is in the lowermost position. As the operating shaft 163ª is rotated in the direction indicated by the arrow, which is the direction of motion required to actuate the coin sorting and counting mechanism and also the registering mechanism, the lowermost lug 257 passes into the clearance between the split ends 258ª and 258ᵇ and engages the under side of the upper one of said split ends 258ª, lifting the latch 258 until the said lug 257 is disengaged from said upper end 258ª, at which time the latch 258 is disengaged and falls by its own weight in time to present a clear opening for the other one of said lugs 257, which by this time has reached its lowermost position. This operation continues as the shaft 163ª is rotated, each lug serving to lift the latch and release it in time for the other lug to enter the clearance opening between the two split portions 258ª and 258ᵇ. If it is attempted to rotate the shaft 163ª at a rate greater than that for which the mechanism is designed, the inertia of the latch 258 will prevent it dropping in time to clear the lowermost lug, and as a result the leading side of said lug will engage the end of the portion 258ᵇ and positively lock the apparatus and prevent further rotation of the operating shaft. If this occurs, it is an indication that an attempt is being made to operate the mechanism at too rapid a rate.

It is understood that while I have shown the various features of my invention in the particular embodiments above described I may employ many modifications and equivalent constructions for accomplishing the results pointed out, and that I do not limit myself to the mechanism herein shown and described, as any equivalents may be employed without departing from my invention.

What I claim is:

1. In combination a coin receptacle, coin measuring mechanism having a distinct and independent measuring position for each value of coin to be registered, coin feeding mechanism to withdraw coins one at a time from said receptacle and transfer them to the coin measuring mechanism and a coin register for registering the coins measured by said measuring mechanism.

2. In combination a coin receptacle for receiving coins of different denominations, coin measuring mechanism having a distinct and independent measuring position for each coin to be measured, power driven coin feeding mechanism to feed coins one at a time indiscriminately from said receptacle to said measuring mechanism, a trip register for registering coins as fares, said trip register operated by said coin measuring mechanism, and resetting mechanism for resetting said trip register.

3. In combination a coin receptacle for receiving coins of different denominations, power driven coin measuring mechanism for measuring individual coins one at a time, said measuring mechanism having a distinct and independent measuring position for each coin to be measured, coin feeding mechanism for feeding coins one at a time indiscriminately from said coin receptacle to said coin measuring mechanism, a coin register for registering said coins in terms of fares, a normally disconnected coupling between said mechanism and said registers, means rendered active by the presence of the coin in the measuring position in said measuring mechanism for connecting said coupling between said measuring mechanism and said registering mechanism, and means for resetting said trip register.

4. In combination, a trip-register for measuring coins in terms of fares, a coin-receptacle for receiving coins of various denominations, a coin-measuring mechanism, power-driven coin-feeding mechanism for feeding said coins from said receptacle to said measuring-mechanism, one at a time, a normally-inactive operative connection between said coin-measuring mechanism and said register, said connection being rendered active by the presence of a coin in said measuring-mechanism, and resetting-mechanism for resetting said trip-register.

5. In combination, a coin receptacle for receiving coins of various denominations, coin-measuring mechanism having a distinct and independent measuring position for each coin to be measured, power-driven coin-feeding mechanism for feeding coins one at a time from said receptacle to said measuring mechanism, a totalizing register and a trip-register registering said coins in terms of fares, an operative connection between said coin-measuring mechanism and said registers, and means for resetting said trip-register.

6. In combination, a coin receptacle for receiving coins of various denominations, coin-measuring mechanism having a distinct and independent measuring position for each coin to be measured, power-driven coin-feeding mechanism for feeding coins one at a time from said receptacle to said measuring mechanism, a totalizing register and a trip-register for registering the coins in terms of fares, normally-disconnected operating-mechanism between said coin-measuring mechanism and said registering-mechanism, and means rendered active by the presence of a coin in said measuring-mechanism for connecting said operating-mechanism to actuate said trip-register.

7. In combination a coin receptacle for receiving coins of different denominations, coin measuring mechanism, power driven coin feeding mechanism to feed coins one at a time from said receptacle to said measuring mechanism, a trip register for registering said coins as fares, said trip register being operated by said coin measuring mechanism, resetting mechanism for resetting said trip register, and means for preventing resetting while a coin is in said measuring mechanism.

8. In combination, a coin receptacle for receiving coins of different denominations, coin measuring mechanism, power driven coin feeding mechanism to feed coins one at a time from said receptacle to said measuring mechanism, an accumulating register for registering all of said coins that are measured, a trip register for registering said coins as fares, said registers being operated by said coin measuring mechanism, resetting mechanism for resetting said trip register, and means to prevent operation of said resetting mechanism while the coin is being measured.

9. In combination a coin receptacle for receiving coins of different denominations, coin measuring mechanism, power driven coin feeding mechanism to feed coins from said receptacle to said measuring mechanism, a trip register for registering said coins as fares, said register being operated by said coin measuring mechanism, resetting mechanism for resetting said trip register, and means for preventing operation of said resetting mechanism until said coin receptacle is empty.

10. In combination a coin hopper for receiving coins of different denominations in bulk, rotary coin feeding mechanism for withdrawing the coins indiscriminately one at a time from said coin hopper, measuring or identifying means for receiving the coins from said feeding device, registering means for registering the value of the coins measured or identified, and a common driving shaft connected to said feeding mechanism and to said identifying means, and a clutch controlled by said identifying means to connect said shaft to said registering means.

11. In combination, a coin receptacle for receiving coins of different denominations in bulk, a feeding device for feeding coins one at a time from said coin receptacle, coin identifying or measuring means for receiving coins from said feeding device, an operating shaft connected to said feeding device and to said identifying means, cam means connected to said shaft and rotating synchronously with said identifying means, a coin register and clutch means for connecting said shaft with said registering means to register the coins identified, said clutch being controlled by said cam means.

12. In combination, a coin receptacle for receiving coins of different denominations in bulk, a feeding device for feeding coins one at a time from said receptacle, coin identifying or measuring means for receiving coins from said feeding device, said means having a plurality of stops for holding each, a designated denomination of coins, a shaft connected to said feeding means and to said identifying means, finding means adapted to test each of said stops for the presence of a coin and a coin register controlled by said finding means for registering the value of each coin measured.

13. In a coin register, the combination of coin registering mechanism, coin handling devices, comprising a receptacle for receiving deposited coins of different denominations in bulk, coin measuring mechanism, a rotary coin feeding mechanism for receiving the coins indiscriminately from said receptacle, gearing between said coin measuring mechanism and the registering mechanism, said coin measuring mechanism comprising a movable measuring element for measuring the coins and mechanism coöperating with said movable element for advancing the registering mechanism, amounts corresponding to the particular coin measured.

14. In combination, coin registering mechanism, a receptacle for receiving deposited coins of different denominations, a rotary coin feeding mechanism for receiving the coins indiscriminately one at a time from said receptacle, coin measuring mechanism, gearing between said coin measuring mechanism and the registering mechanism, said coin measuring mechanism comprising a rotary coin measuring element, and mechanism coöperating with said measuring element to control the advance of the registering mechanism according to the individual coins measured.

15. In combination, coin registering mechanism, a receptacle for receiving deposited coins of different denominations in bulk, a rotary coin feeding mechanism for receiving the coins one at a time from said receptacle, coin measuring mechanism for receiving said coins from said feeding mechanism, an operative connection between said measuring mechanism and the registering mechanism, said coin measuring mechanism comprising a fixed support and a rotary measuring element for engaging opposite edges of each coin in turn and moving the same in a fixed path upon said support, and mechanism coöperating with said rotary element for controlling the advance of the registering mechanism in accordance with the value of each coin measured.

16. In combination, a coin register, a receptacle for receiving deposited coins of different denominations in bulk, a rotary coin feeding mechanism for receiving the coins one at a time from said receptacle, coin measuring mechanism, an operative connection between said coin measuring mechanism and the registering mechanism, said coin measuring mechanism comprising a fixed support for receiving the coins to be measured, a rotary measuring element for engaging the edges of the coins measured, and a finger for testing the presence of each coin as it is engaged by the measuring element and means controlled by said finger for governing the operation of said coin registering mechanism according to the value of each coin measured.

17. In combination, a coin register, a receptacle for receiving deposited coins of different denominations in bulk, a rotary coin feeding mechanism for withdrawing the coins indiscriminately one at a time from said receptacle, measuring mechanism for receiving the coins from said feeding mechanism, an operative connection between said coin measuring mechanism and the registering mechanism, said coin registering mechanism comprising diameter gaging devices for engaging the coin and a movable finger for engaging each coin to control the operation of the registering mechanism according to the value of each coin.

18. In combination, coin registering mechanism, a receptacle for receiving deposited coins of different denominations, coin measuring mechanism, a rotary coin carrier for withdrawing the coins one at a time from said receptacle and conveying them to said measuring mechanism, an operative connection between said measuring mechanism and the registering mechanism, said measuring mechanism comprising a relatively fixed plate for receiving the coins to be measured one at a time, a rotary measuring element having an inner measuring cam and an outer cylindrical wall for engaging opposite sides of the coins to be measured, and moving them upon the plate, a wiper for holding the coins in position in the measuring element and a finger movable through said wiper for engaging each coin in turn to control the operation of the registering mechanism according to the value of said coins.

19. In combination, a coin receptacle for receiving coins of different denominations, in bulk, rotary coin gaging or identifying means, rotary coin feeding means for withdrawing the coins one at a time from said hopper and discharging them into said rotary gaging means, an individual chute for receiving different denominations of coins from said gaging or identifying means.

20. In combination a coin receptacle adapted to receive coins of different denominations in bulk, movable coin gaging means, coin feeding means for withdrawing said coins indiscriminately one at a time from said receptacle and discharging them into said gaging means, a coin register controlled by said gaging means for registering the value of each coin in turn and a plurality of chutes for receiving different denominations of coins as they are discharged from said gaging means.

21. In combination, a coin register, a receptacle for receiving deposited coins of different denominations in bulk, said receptacle comprising an inclined circular coin pan having an outlet opening near its upper portion, mechanism for rotating said pan to deliver the coins contained therein one at a time through said opening, a rotary coin measuring chamber below said opening, said chamber being adapted to receive said coins one at a time and means controlled by said coin measuring chamber for operating said register in accordance with the coins measured.

22. In a coin register, a receptacle for receiving deposited coins in bulk, said receptacle consisting of an inclined coin pan having an upwardly and inwardly extending rim secured thereto, said rim having an inwardly extending projection for turning the coin flat on the bottom of the pan as the latter is rotated, the bottom of the pan having an opening formed therein for engaging the coins in the pan one at a time, a supporting plate for the pan having a delivery opening under the pan near its upper edge, and coin counting mechanism for receiving the coins one at a time from said opening.

23. In a coin register a receptacle for receiving deposited coins in bulk, said receptacle comprising an inclined coin pan having an upwardly extending rim secured thereto, said rim having an inwardly extending projection thereupon for turning the coins flat on the bottom of the pan as the latter is rotated, said rim having perforations through it smaller than the smallest coin to be handled to permit the passage from the coin pan of dirt and small foreign objects, the bottom of the pan having openings formed therein for engaging the coins in the pan one at a time, and a supporting plate for the pan having a delivery opening under the pan near its upper edge.

24. In a coin register, a receptacle for receiving deposited coins in bulk, said receptacle comprising an inclined coin pan having an upwardly extending rim, the bottom of the pan having openings formed therein for engaging the coins in the pan one at a time, a supporting plate for the pan having a delivery opening under the pan near its upper edge, and a wiper plate held by spring pressure upon the top surface of the pan bottom over the delivery opening for preventing more than one coin reaching the delivery opening at a time, said wiper plate having a front edge laterally inclined to the path of travel of the coin.

25. In a coin register, the combination of registering mechanism, a receptacle for receiving deposits of coins, said receptacle comprising an inclined coin pan having an upwardly extending rim, the bottom of the pan having openings formed therein for engaging the coins in the pan one at a time, a supporting plate for the pan having a delivery opening under the pan near its upper edge, intermittent gearing for driving the coin pan, said gearing having points of rest when the coins reach the delivery opening to facilitate the passage of the coins therethrough and coin measuring mechanism for receiving the coins from said opening and to control the actuation of the registering mechanism according to the value of each coin delivered.

26. In combination an inclined coin pan having an upwardly extending rim, the bottom of said pan having openings formed therein for engaging the coins in the pan one at a time, a supporting plate for the pan having a delivery opening under the pan near its upper edge, driving means for said pan, said driving means comprising intermittent gearing having points of rest when the coins reach the delivery opening in order to facilitate the passage of coins therethrough.

27. In a coin register, the combination of registering mechanism, and coin handling devices comprising a rotary receptacle comprising a coin-pan for receiving deposited coins having a delivery opening, and a rotary coin measuring passage-way for receiving the coins delivered from the coin pan, the direction of rotation of the coin pan and coin measuring passage-way being such that the direction of motion of a coin is continuous as it is delivered into said coin measuring passageway.

28. In a coin register, the combination of registering mechanism, and coin handling devices comprising a hopper for receiving deposited coins, a trap door for closing the lower end of the hopper, an operating shaft for actuating the registering mechanism independently of the trap-door, and devices actuated by the operating shaft for opening the trap door when desired.

29. In combination a coin register, a coin hopper for receiving coins in bulk, coin measuring mechanism for measuring the coins received by said hopper, a shaft for operating said measuring mechanism to control registration of said coins upon said register, a trap door for said hopper, means for operating said shaft to actuate said measuring mechanism independently of said trap doors and to operate said trap door independently of said measuring mechanism.

30. In combination, a coin register, a hopper for receiving coins in bulk, coin measuring mechanism for measuring said coins one at a time, a trap door for said hopper, feeding mechanism for feeding the coins one at a time to said measuring mechanism, and a shaft for operating said trap door, said feeding and said measuring mechanism, said shaft being independently operable for actuating said feeding and measuring mechanism to control registration of said coins upon said register.

31. In combination a coin register, a hopper for receiving coins in bulk, a coin receptacle below said hopper, a trap door between said hopper and said receptacle, feeding mechanism for feeding coins one at a time from said receptacle, measuring mechanism for measuring said coins one at a time and for controlling the registration of said coin register in accordance with the value of a coin, a shaft rotatable in one direction for operating said feeding and measuring mechanism solely, and movable in the reverse direction to operate said trap door.

32. In a coin register, the combination of registering mechanism, and coin handling devices comprising a hopper for receiving deposited coins, a trap door for closing the lower end of the hopper, and an operating shaft for actuating the registering mechanism, said shaft being capable of backward rotation independently of said registering-mechanism to open said trap-door.

33. In a coin register, the combination of registering mechanism, and coin handling devices comprising a hopper for receiving deposited coins, a trap door for closing the lower end of the hopper, an operating shaft for actuating the registering mechanism independently of motion of said trap-door, back rotation of said shaft serving to open said trap door, and a coin pan for receiving the coins delivered by said trap door, said coin pan being actuated by said operating shaft.

34. In a coin register, the combination of registering mechanism, and coin handling devices comprising a hopper for receiving deposited coins, a trap door for closing the lower end of the hopper, an operating shaft for actuating the registering mechanism independently of said trap-door, back rotation of said shaft serving to open said trap door, and coin measuring devices for receiving the coins delivered from the trap door, said coin sorting devices being actuated by said operating shaft.

35. In a coin register, the combination of registering mechanism, and coin handling devices comprising a hopper for receiving deposited coins, a trap door for closing the lower end of the hopper, an operating shaft for actuating the registering mechanism independently of said trap-door, back rotation of said shaft serving to open said trap door coin measuring devices for receiving the coins delivered from the trap door, said coin measuring devices actuated by said operating shaft, and controlling devices actuated by the measured coins for determining the amount of actuation of the registering mechanism.

36. In a coin register, the combination of registering mechanism, and coin handling devices comprising a hopper for receiving deposited coins, a trap door for closing the lower end of the hopper, an operating shaft for actuating the registering mechanism independently of said trap door, back rotation of said shaft serving to open said trap door coin measuring devices for receiving the coins delivered from the trap door, said coin measuring devices actuated by said operating shaft, and a counting finger actuated by each measured coin for causing an advance of the registering mechanism corresponding to the value of said coin.

37. In a coin register, the combination of registering mechanism, and coin handling devices comprising a hopper for receiving deposited coins, a trap door for closing the lower end of the hopper, an operating shaft for actuating the registering mechanism independently of said trap-door, back rotation of said shaft serving to open said trap door, a coin pan for receiving the coins delivered by said trap door, said coin pan actuated by said operating shaft, coin measuring devices for receiving the coins from the coin pan, said coin measuring devices actuated by said operating shaft, controlling devices actuated by the measured coins for determining the amount of actuation of the registering mechanism, and a wiper associated with the coin pan for delivering the coins one at a time to the coin measuring devices.

38. In a coin register, the combination of registering mechanism, and coin handling devices comprising a coin receptacle for the deposited coins, coin measuring mechanism, an operating shaft, differential gearing between the registering mechanism and the coin measuring mechanism for advancing the registering mechanism amounts corresponding to the measured coins, said differential gearing being normally disconnected from the registering mechanism, a differential lever for connecting the differential gearing with said registering mechanism at certain times, a counting finger engaging each measured coin for actuating said differential lever to cause the registering mechanism to advance an amount corresponding to the value of said coins, and devices for positively terminating the intervals of operation of the registering mechanism.

39. In a coin register, the combination of registering mechanism, and coin handling devices comprising a coin receptacle for the deposited coins, coin measuring mechanism, an operating shaft, differential gearing between the registering mechanism and the coin measuring mechanism for advancing the registering mechanism amounts corresponding to the measured coins, said differential gearing being normally disconnected from the registering mechanism, a differential lever for connecting the differential gearing with said registering mechanism at certain times, a counting finger engaging each measured coin for actuating said differential lever to cause the registering mechanism to advance an amount corresponding to the value of said coins, and a cam for positively moving the differential lever to disconnect the registering mechanism at the end of the operating intervals of said registering mechanism corresponding to the coins registered.

40. In a coin register, the combination of registering mechanism, and coin handling devices comprising a coin receptacle for the deposited coins, coin measuring mechanism, an operating shaft, differential gearing between the registering mechanism and the coin measuring mechanism for advancing the registering mechanism amounts corresponding to the measured coins, said differential gearing having two rotary members engaging connecting gears carried by the operating element of said differential gearing and driven from the operating shaft, and a control dog for engaging either of said members to determine the amount of advance of the registering mechanism.

41. In a coin register, the combination of registering mechanism, and coin handling devices comprising a coin receptacle for the deposited coins, coin measuring mechanism, an operating shaft, differential gearing between the registering mechanism and the coin measuring mechanism for advancing the registering mechanism amounts corresponding to the measured coins, said differential gearing having two rotary members engaging connecting gears carried by the operating element of said differential gearing and driven from the operating shaft, and control dogs actuated by the coin measuring mechanism for engaging either of said members to determine the amount of advance of the registering mechanism.

42. In a coin register, the combination of registering mechanism, and coin handling devices comprising a coin receptacle for the deposited coins, coin measuring mechanism, an operating shaft, differential gearing between the registering mechanism and the coin measuring mechanism for advancing the registering mechanism amounts corresponding to the measured coins, said differential gearing having two rotary members engaging connecting gears carried by the operating element of said differential gearing and driven from the operating shaft, control dogs for engaging either of said members, and a counting finger operating said control dogs for engaging each measured coin to cause the registering mechanism to advance an amount corresponding to the value of said coin.

43. In a coin register, the combination of registering mechanism, and coin handling devices comprising a coin receptacle for the deposited coins, coin measuring mechanism, an operating shaft, differential gearing between the registering mechanism and the coin measuring mechanism for advancing the registering mechanism amounts corresponding to the measured coins, said differential gearing having two rotary members engaging connecting gears carried by the operating element of said differential gearing and driven from the operating shaft, control dogs for engaging either of said members, a counting finger operating said control dogs for engaging each measured coin to cause the registering mechanism to advance an amount corresponding to the value of said coin, and a cam for positively returning the control dogs to a position releasing the registering mechanism at the end of the operating periods corresponding to the values of the measured coins.

44. In a coin register, the combination of registering mechanism, and coin handling devices comprising a coin receptacle for the deposited coins, coin measuring mechanism, an operating shaft, differential gearing between the registering mechanism and the coin measuring mechanism for advancing the registering mechanism amounts corresponding to the measured coins, said differential gearing having two rotary members engaging connecting gears carried by the operating element of said differential gearing and driven from the operating shaft, a control dog for engaging either of said members to determine the amount of advance of the registering mechanism, and a cam for positively returning said control dog to a position releasing the registering mechanism at the ends of the operating periods of said registering mechanism.

45. In a coin register, the combination of registering mechanism, and coin handling devices comprising a coin receptacle for the deposited coins, coin measuring mechanism, an operating shaft, differential gearing between the registering mechanism and the coin measuring mechanism for advancing the registering mechanism amounts corresponding to the measured coins, said differential gearing having two rotary members engaging connecting gears carried by the operating element of said differential gearing and driven from the operating shaft, and a control dog for engaging either of said members to determine the amount of advance of the registering mechanism, a first one of said rotary members being connected with the registering mechanism and the other rotary member free and said control dog normally engaging said first rotary member and disengaged from said other rotary member.

46. In a coin register, the combination of registering mechanism, and coin handling devices comprising a coin receptacle for the deposited coins, coin measuring mechanism, an operating shaft, differential gearing between the registering mechanism and the coin measuring mechanism for advancing the registering mechanism amounts corresponding to the measured coins, said differential gearing having two rotary members engaging connecting gears carried by the operating element of said differential gearing and driven from the operating shaft, a control dog for engaging either of said members to determine the amount of advance of the registering mechanism, a first one of said rotary members being connected with the registering mechanism and the other rotary member free and said control dog normally engaging said first rotary member and disengaged from said other rotary member, and devices actuated by the coin measuring mechanism for moving said control dog to release said first rotary member and engage said other rotary member for intervals to advance the registering mechanism amounts corresponding to the coins sorted.

47. In a coin handling machine, the combination of registering-mechanism, coin-measuring mechanism for operating said registering-mechanism, a hopper for receiving the coins, a trap door forming the bottom of the hopper, an operating shaft rotatable in one direction for actuating said coin-measuring mechanism independently of said door, and devices for operating the trap door by back rotation of said shaft.

48. In a coin handling machine, the combination of coin-measuring mechanism a hopper for receiving the coins, a trap door forming the bottom of the hopper, an operating shaft for actuating the measuring mechanism by motion in one direction independently of said door, and devices for operating said trap door by motion in another direction of said operating shaft.

49. In combination, a coin register, movable coin identifying means, a finding finger, a differential lever connected to said finding finger, a cam for moving said lever, a driving shaft for driving said identifying means and said cam, and a clutch for operatively connecting said shaft and said register to register the coins measured.

50. In combination a coin register, coin identifying means, a finding finger, a differential lever connected to said finding finger, cam means for moving said lever, a driving shaft for driving said identifying means and said cam means, a clutch for operatively connecting said shaft and said register to register the coins and means for feeding coins one at a time to said measuring mechanism.

51. In a coin measuring machine, the combination of a receptacle for receiving coins deposited in the machine, and measuring devices for receiving the coins from said receptacle comprising a rotary coin-engaging cam having projections thereon in definite sequence one for each kind of coin to be sorted.

52. In a coin measuring machine, the combination of a receptacle for receiving coins deposited in the machine, and measuring devices for receiving the coins from said receptacle comprising a movable measuring device for engaging the coins one after another in a predetermined cycle of operation, said measuring device adapted to engage one coin of each kind to be measured by the machine in each cycle and deliver said coins from the measuring mechanism.

53. In a coin measuring machine, the combination of a receptacle for receiving coins deposited in the machine, and measuring devices for receiving the coins from said receptacle comprising a fixed plate for supporting the coins to be measured, and a rotating measuring passage-way engaging opposite ends of the coins one at a time for moving them through the measuring mechanism and delivering them therefrom.

54. In a coin measuring machine, the combination of a receptacle for receiving coins deposited in the machine, measuring devices for receiving the coins from said receptacle comprising a fixed plate for supporting the coins, a rotary cam having projections of different length for engaging different size coins while resting upon the plate, and a rotary retaining wall moving with said cam for holding a coin in position upon said plate to be engaged selectively by one of said projections.

55. In a coin measuring machine, the combination of a receptacle for receiving coins deposited in the machine, and measuring devices for receiving the coins from said receptacle comprising a fixed plate for supporting the coins to be measured, a rotary cam having outwardly extending projections of different length adjacent to the surface of the plate for engaging coins of different size, a tubular retaining wall surrounding the plate for supporting the outer edges of the coins to hold them in engagement with said projections, and a device for positively removing the coins from between said projections and said retaining wall and delivering the coins from the measuring mechanism.

56. In a coin measuring machine, the combination of a receptacle for receiving coins deposited in the machine, and measuring devices for receiving the coins from said receptacle comprising a fixed plate for supporting the coins to be measured, a rotary cam having outwardly extending projections of different lengths adjacent to the surface of the plate for selectively engaging coins of different size, a tubular retaining wall surrounding the plate for supporting the outer edges of the coins to hold them selectively in engagement with said projections, and a spring-actuated pressure plate resting upon said fixed plate for holding the coins in position upon said fixed plate between said projections and said retaining wall, said pressure plate having a curved end for positively removing each coin from the measuring mechanism.

57. In a coin measuring machine, the combination of a receptacle for receiving coins deposited in the machine, and measuring devices for receiving the coins from said receptacle comprising a moving measuring device for selectively engaging the coins one after another in a predetermined cycle of operation, said measuring device adapted to engage one coin of each kind to be measured by the machine in each cycle and deliver said coins in predetermined sequence from the measuring mechanism, and a delivery chute for receiving the coins from the measuring mechanism.

58. In a coin measuring machine, the combination of a receptacle for receiving coins deposited in the machine, and measuring devices for receiving the coins from said receptacle comprising a moving measuring device for selectively engaging the coins one after another in a predetermined cycle of operation, said measuring device adapted to engage one coin of each kind to be measured by the machine in each cycle and deliver said coins in predetermined sequence from the measuring mechanism, and separate receptacles for receiving the coins from the measuring machine, each receptacle receiving coins of but a certain kind.

59. In a coin measuring machine, the combination of a receptacle for receiving coins deposited in the machine, and measuring means for receiving the coins from said receptacle comprising a movable measuring cam for engaging the coins one after another in a predetermined cycle of operation said measuring device adapted to engage one coin of each kind to be measured by the machine in each cycle and deliver said coins in predetermined sequence from the sorting mechanism, and a counting finger actuated independently of said coin for engaging each coin as it passes through the measuring means.

60. In a coin sorting machine, the combination of a receptacle for receiving coins deposited in the machine, and measuring means for receiving the coins from said receptacle comprising a fixed plate for supporting the coins to be measured, a rotary cam having outwardly extending projections of different lengths adjacent to the surface of the plate for engaging coins of different size, a tubular retaining wall surrounding the plate for supporting the outer edges of the coins to hold them in engagement with said projections, a spring-actuated pressure plate resting upon said fixed plate for holding the coins in position upon said fixed plate between said projections and said retaining wall, said pressure plate having a curved end for positively removing each coin from the measuring mechanism, and a counting finger operating through said spring-actuated pressure plate for engaging each coin as it passes through the measuring mechanism.

61. In a coin counting mechanism, the combination of registering devices, coin counting mechanism, differential gearing between said mechanisms comprising two end members and an intermediate member between said mechanisms, an operating shaft for actuating said intermediate member, connections between a first one of said end members and the registering mechanism, locking mechanism normally engaging said first end member and disengaged from said other end member, and devices actuated by each coin sorted for disengaging the locking mechanism from said first end member and engaging said other end member to actuate the registering mechanism.

62. In a coin counting mechanism, the combination of registering devices, coin counting mechanism, differential gearing between said mechanisms comprising two end members and an intermediate member between said mechanisms, an operating shaft for actuating said intermediate member, connections between a first one of said end members and the registering mechanism, locking mechanism normally engaging said first end member and disengaged from said other end member, and a counting finger moved into engagement with each coin sorted by motion of the operating shaft to release the locking mechanism from engagement with said first member and to engage said other member.

63. In a coin counting mechanism, the combination of registering devices, coin counting mechanism, differential gearing between said mechanisms comprising two end members and an intermediate member between said mechanisms, an operating shaft for actuating said intermediate member, connections between a first one of said end members and the registering mechanism, locking mechanism normally engaging said first end member and disengaged from said other end member, a counting finger moved into engagement with each coin measured by motion of the operating shaft to release the locking mechanism from engagement with said first member and to engage said other member, and a cam plate for actuating said counting finger.

64. In combination, a differential gear mechanism comprising two end members, an intermediate driving member and gear connections between said intermediate member and said end members, a control dog normally engaging one of said end members and free from the other end member, a lever for moving said controlling dog to release the engaged end member and engage the other end member as desired and coin-controlled mechanism operable to shift said lever.

65. In combination, a differential gear mechanism comprising two end members, an intermediate driving member and gear connections between said intermediate member and said end members, a control dog normally engaging one of said end members and free from the other end member, a lever for moving said controlling dog to release the engaged end member and engage the other end member as desired, a cam plate for actuating said lever and coin-counting mechanism operated by coins to shift said lever.

66. In combination, a differential gear mechanism comprising two end members, an intermediate driving member and gear connections between said intermediate member and said end members, a control dog normally engaging one of said end members and free from the other end member, a lever for moving said controlling dog to release the engaged end member and engage the other end member as desired, a cam plate for actuating said lever, said cam plate consisting of sheet metal having a flange formed at substantially right angles to the body of said sheet metal to form the cam surface and coin-controlled mechanism for presenting a coin to coöperate with said lever.

67. In combination, a differential gear mechanism comprising two end members, an intermediate driving member and gear connections between said intermediate member and said end members, a control dog normally engaging one of said end members and free from the other end member, a lever for moving said controlling dog to release the engaged end member and engage the other end member as desired, a cam plate for actuating said lever, a locking lever connected with said dog for holding it in actuated position as desired and coin-controlled mechanism for presenting a coin to coöperate with said lever.

68. In combination, a differential gear mechanism comprising two end members, an intermediate driving member and gear connections between said intermediate member and said end members, a control dog normally engaging one of said end members and free from the other end member, a lever for moving said controlling dog to release the engaged end member and engage the other end member as desired, a cam plate for actuating said lever, a locking lever for holding said dog in actuated position, a cam for holding the locking lever in its actuated position for a desired interval and coin-controlled mechanism for presenting a coin to coöperate with said lever in moving said dogs.

69. In combination, a coin controlled register, a differential gear mechanism, for intermittently operating said register, said mechanism comprising two end members, one of said end members being connected to said register, an intermediate driving member and gear connections between said intermediate member and said end members, a control dog normally engaging one of said end members and free from the other end member, a lever for moving said controlling dog to release the engaged end member and engage the other end member as desired, a differential lever for pivotally supporting said controlling dog, a cam for actuating said differential lever, motion of the free end of said lever when unrestrained permitting said controlling dog to remain in its normal position, and motion of said differential lever when its free end is restrained serving to move said controlling dog to release the normally engaged end member and engage the other end member of the differential gear mechanism and coin-controlled mechanism for presenting a coin to cause actuation of said lever.

70. A coin-counting cam comprising a sheet metal body portion and a continuous up-turned flange formed from said body portion to form the operating cam surface.

71. A coin-counting cam comprising a sheet metal body portion and a continuous flange formed at substantially right angles from said body portion to constitute the operating cam surface.

72. In combination, a coin-counting cam comprising a sheet metal body portion having an up-turned flange formed from said body portion to constitute the cam surface, a lever, and two rollers carried by said lever and disposed upon opposite sides of said flange and coin-controlled mechanism for presenting a cam to one end of said lever.

73. In a coin register, the combination of a trip register for indicating in terms of fares the number of fares received for each trip, a resetting device for said trip register, a total register geared to the trip register in a ratio to indicate in terms of units of a money system the total amount of money received for the fares registered during all of the trips, means for receiving coins of values differing from the value of a fare, and coin evaluating means for measuring all the coins received for fares and transferring the value to the total register.

74. In a coin register, the combination of a trip fare register, resetting devices for said trip fare register, a total register for indicating the total amount in cents received by the operator of the register, gearing between the total register and the trip register for advancing the trip register one step each time that the total number of cents registered on the total register equals a predetermined fare, and coin evaluating means for indiscriminately measuring coins received for fares and transferring the value to the total register.

75. In combination, a trip register for indicating the total number of fares, resetting means for resetting the trip register, a total register for registering all the money received in terms of units less than fares, said total register being geared to said trip register by means capable of actuating the trip register only when the units total a fare, and coin evaluating means for receiving and indiscriminately measuring coins received for fares and transferring the value to the total register.

76. In a coin register, the combination of coin-measuring mechanism, an operating shaft, a trip fare register, re-setting mechanism for said register, connecting devices between the coin-measuring mechanism and the trip register, and mechanism for preventing the re-setting of the trip register while a coin is in the coin-measuring mechanism.

77. In a coin register, the combination of coin-measuring mechanism, an operating shaft therefor, said coin-measuring mechanism requiring a predetermined number of turns of said operating shaft for passage of a coin therethrough, a trip fare register, re-setting mechanism for said register, connecting devices between the coin-measuring mechanism and the trip register, and mechanism requiring a pre-determined number of free turns of the operating shaft before it is possible to operate the re-setting mechanism.

78. In combination, a coin feeding device, a coin measuring device, a driving shaft for driving both of said devices, a trip register having resetting means, connections controlled by the coin measuring device for connecting the driving shaft to the register, and means for preventing operation of the driving shaft during the operation of resetting, said means operating at a point to prevent stresses being imposed on the feeding and measuring devices and the register.

79. In combination, a rotary coin measuring device for measuring coins one at a time, a rotary shaft for driving said device, a trip register having an operated shaft controlled by said device, resetting means for the register and blocking means for preventing operation of the rotary shaft during re-setting, said blocking means being connected at a point back of the driving connection of the register operating shaft.

80. In a coin register, the combination of coin-handling mechanism, an operating shaft, a trip register, re-setting mechanism for said register, connecting devices between the coin-handling mechanism and the trip register, and inter-locking mechanism for preventing re-setting of the trip register while a coin is in the coin-handling mechanism and for preventing actuation of the operating shaft during a re-setting operation.

81. In a coin register, the combination of coin-handling mechanism, an operating shaft, a trip register, re-setting mechanism for said register, connecting devices between the coin-handling mechanism and the trip register, an inter-lock extending from the re-setting mechanism to the coin-handling mechanism, and a member actuating said interlock while in locking position to prevent actuation of said re-setting mechanism and serving while in its alternate position to release said inter-lock and re-setting mechanism, operation of the coin-handling mechanism upon a coin serving to move said member to its locking position.

82. In a coin register, the combination of a trip register, re-setting mechanism, coin-handling mechanism comprising an operating shaft, a trap door or doors for receiving deposited coins, and coin-measuring devices, an inter-lock extending from the re-setting mechanism to the coin handling mechanism, a member having locking and releasing positions for establishing through said inter-lock corresponding conditions of the re-setting mechanism, and devices between said member and the trap door or doors for causing said member to move to its locking position when the trap door or doors are actuated.

83. In a coin register, the combination of a trip register, re-setting mechanism, coin-handling mechanism comprising an operating shaft, a trap door or doors for receiving deposited coins, and coin-measuring devices, an inter-lock extending from the re-setting mechanism to the coin-handling mechanism, a member having locking and releasing positions for establishing through said inter-lock corresponding conditions of the re-setting mechanism, and devices between said member and the coin measuring mechanism for moving said member to its locking position when a coin is engaged by said coin-sorting mechanism.

84. In a coin register, the combination of a trip register, re-setting mechanism, coin-handling mechanism comprising an operating shaft, a trap door or doors for receiving deposited coins, and coin-measuring devices, an inter-lock extending from the re-setting mechanism to the coin-handling mechanism, a member having locking and releasing positions for establishing through said inter-lock corresponding conditions of the re-setting mechanism, actuating mechanism for said trip register, and connections 85. In a coin register, the combination of registering mechanism, coin-handling mechanism, a column connecting the registering mechanism with the coin-handling mechanism, a casing for the registering mechanism, a lock extended through the column for holding said casing in place within the frame of the registering mechanism, a casing for the coin-handling mechanism, a device carried by the frame of the coin-handling mechanism for holding said lock in place, a collar on said column for holding the casing of the coin-handling mechanism in place, and a device within the casing of the coin-handling mechanism for preventing the removal of said collar from its position holding said casing in place.

86. In a coin register, the combination of registering mechanism, coin-handling mechanism, a column connecting the registering mechanism with the coin-handling mechanism, a casing for the registering mechanism, a lock extended through the column for holding said casing in place within the frame of the registering mechanism, a casing for the coin-handling mechanism, a device carried by the frame of the coin-handling mechanism for holding said lock in place, a collar on said column for holding the casing of the coin-handling mechanism in place, a device within the casing of the coin-handling mechanism for preventing the removal of said collar from its position holding said casing in place, and a seal in the casing of the coin-handling mechanism for permitting access to said device by breaking said seal.

87. In combination, coin-measuring mechanism comprising a coin register, a coin hopper, coin-feeding mechanism, a pair of members forming a passage-way of successively decreasing area, a testing finger operatively connected to said register, said members receiving the coins from said feeding-mechanism and moving them past said testing finger, and means for moving said finger to test the presence of a coin at predetermined points in said passage-way.

88. Coin-measuring mechanism comprising a coin register, a coin hopper for receiving coins, a pair of members forming a circular passage-way of an area decreasing in definite steps corresponding to said coins to be measured, feeding-mechanism for feeding coins from said hopper to said pair of members, and a testing finger respectively moved at right angles to said passage-way to test the presence of a coin in each step of said passage-way, and operating mechanism for said register controlled by said finger.

89. Coin-measuring mechanism comprising a coin register, a pair of members forming a circular passage-way decreasing in successive steps corresponding to the coins to be measured, means to rotate said members together, means to feed the coins into said passage-way for each rotation thereof, a testing finger for testing in each step of the passage-way for the presence of a coin, and means controlled by said finger for operating a register an amount corresponding to the value of coins of predetermined sizes.

90. In combination, a register having an operating-shaft, a coin hopper, a pair of measuring members forming a rotating circular track decreasing in size in definite predetermined steps corresponding to the value of the coin to be registered, driving-mechanism for rotating said track, a normally-disengaged clutch between said driving mechanism and said register, a testing finger for testing the presence of a coin in any one of said predetermined steps, means for engaging said clutch to advance said register operating-shaft an angular amount corresponding to the value of the coin detected and controlling means for insuring the engagement of the clutch during the full angular movement.

91. In combination, a register having an operating shaft, a pair of measuring members forming a rotating circular track decreasing in size in definite predetermined steps corresponding to the value of the coin to be registered, driving-mechanism for rotating said track, a normally-disengaged clutch between said driving-mechanism and said register, a testing finger for testing the presence of a coin in any one of said predetermined steps, cams for engaging said clutch to advance said register operating-shaft an angular amount corresponding to the value of the coin detected, and cam means for insuring disengagement of the clutch-mechanism at the end of the completed angular movement.

92. In a coin-measuring mechanism, a pair of measuring-members forming a circular track having portions decreasing in size in definite steps, said steps corresponding in number to the different coin pieces to be measured, means for causing rotation of said members, and means for feeding a single coin only to said members upon each rotation thereof.

93. In a coin-measuring mechanism, a pair of circular measuring-members forming a circular track decreasing in size in predetermined steps corresponding to the coin pieces to be measured, a feeding-mechanism operatively connected to said members and being so constructed as to feed a coin to said circular members for each rotation of said circular members, a testing finger for detecting coins in the steps of said circular track, register mechanism controlled by said testing finger, resetting means for said register, said means being rendered inoperable by the movement of said testing finger against a coin to advance said register, and means for releasing said resetting means after a predetermined number of ineffectual tests by said finger.

94. In a coin-measuring mechanism, a pair of measuring members forming a circular track having portions decreasing in size in definite steps, said steps corresponding in number to the different coin pieces to be measured, a driving-shaft connected to said members, a rotating coin-pan geared to said members and provided with feeding-devices for feeding a coin to said members for each rotation of said members, a register, a testing finger operated by a coin in said members for operating said register, resetting means for said register, and means controlled by said finger for locking said resetting-mechanism.

95. In combination, a register, a coin-receiving hopper, a coin-measuring device, means to feed coins from said hopper to said measuring-device, an operating connection from said coin-measuring device to said register, resetting means for said register, and means operated by said resetting means for locking said measuring-device against operation.

96. In combination, a register, a coin-receiving hopper, a coin-measuring device operating in cycles, means to feed coins from said hopper to said measuring-device, an operating connection from said coin-measuring device, a resetting means for said register, means for locking said resetting means against operation until said measuring-device has run empty through a number of cycles, and means for locking said measuring-device against operation during resetting of said register.

97. In combination coin feeding mechanism for feeding coins one at a time, coin measuring mechanism for measuring said coins in turn, a coin register connected to said measuring mechanism for registering each coin in terms of units less than fares, a fare register positively geared to said coin register for registering said coins in terms of even fares only, and resetting means for resetting said fare register only.

98. In combination coin measuring mechanism for measuring coins one at a time, a coin register connected to said measuring mechanism for registering each coin in terms of pennies or decimal multiples thereof, a fare register positively geared to said coin register for registering said coins in terms of even fares as units only, and resetting means for resetting said fare register only.

99. In combination coin measuring mechanism, for measuring coins one at a time, a coin register connected to said measuring mechanism for registering each coin in terms of pennies as units, a fare register positively geared to said coin register for registering said coins in terms of even fares only, resetting means for resetting said fare register only and locking means controlled by said resetting means for locking said measuring mechanism while said resetting means is in use.

100. In combination, a pair of overhead registers comprising a coin register for registering coins in terms of pennies, dimes, dollars, etc., a trip fare register for registering the same coins in terms of fares as units only, coin measuring mechanism for measuring coins one at a time, a vertical column for supporting said registers above said coin measuring mechanism and an operated shaft extending through said column and connecting said measuring mechanism and said registers.

101. In combination, a hopper for receiving coins, a coin carrier for withdrawing coins one at a time from the hopper, a coin identifying device for receiving the coins from said carrier, driving means for the carrier, a register, a clutch device between the driving means and the register, said clutch being controlled by the presence of a coin as determined by the coin identifying means.

102. In combination, a hopper for receiving coins, a coin carrier for withdrawing coins one at a time from the hopper, a coin identifying device for receiving the coins from said carrier, driving means for the carrier, a register, a clutch device between the driving means and the register, said clutch being controlled by the presence of a coin as determined by the coin identifying means, and resetting means for the register, and means for interlocking said resetting means with said driving means.

103. In combination, a coin carrier for carrying coins one at a time, coin identifying means for receiving the coins one at a time from the carrier and identifying them, a register, a driving shaft and a clutch between the register and driving shaft controlled by the identifying means.

104. In combination, a rotary coin carrying device, coin identifying means, a register, driving means for the register controlled by the coin identifying means, resetting means and means controlled by the resetting means to disable the identifying means during resetting.

105. In combination, a register, coin gaging mechanism comprising a passageway of successively decreasing steps, and a finger actuated to test the steps said finger controlling said register.

106. In combination, a register, coin gaging means comprising a passageway of successively decreasing steps, means for periodically introducing a single coin in said passageway, means for making a test for the presence or absence of a coin at each step after the deposit of the coin, and means controlled by said testing means for actuating the register, said device being organized to discharge a registered coin before another is introduced.

107. In a device of the class described, means for receiving coins of values different from the value of a fare, a coin register for registering the total value of coins in terms of units in a money system, a trip register registering only in terms of fares, means for evaluating the coins received and transferring the value of the coins directly upon the coin register, and gearing between the coin register and the trip register for transferring a count to the trip register only when sufficient coins have been registered to pay for a fare.

108. In a device of the class described, means for receiving coins of values different from the value of a fare, a coin register for registering the total value of coins in terms of units in a money system, a trip register registering only in terms of fares, means for evaluating the coins received and transferring the value of the coins directly upon the coin register, gearing between the coin register and the trip register for transferring a count to the trip register only when sufficient coins have been registered to pay for a fare, and means for resetting the trip register without disturbing the total on the coin register.

109. In a device of the class described, means for receiving coins of values different from the value of a fare, a coin register for registering the total value of coins in terms of units in a money system, a trip register registering only in terms of fares, means for evaluating the coins received and transferring the value of the coins directly upon the coin register, gearing between the coin register and the trip register for transferring a count to the trip register only when sufficient coins have been registered to pay for a fare, means for resetting the trip register without disturbing the total on the coin register, and means for preventing operation of the total register while the trip register is being reset.

110. In a device of the class described, means for receiving coins of values different from the value of a fare, a coin register for registering the total value of coins in terms of units in a money system, a trip register registering only in terms of fares, means for evaluating the coins received and transferring the value of the coins directly upon the coin register, gearing between the coin register and the trip register for transferring a count to the trip register only when sufficient coins have been registered to pay for a fare, means for resetting the trip register without disturbing the total on the coin register, and means for preventing resetting of the trip register until a predetermined cycle of empty operations of the coin evaluating mechanism has been made.

111. In combination, means for receiving dimes, nickels and cents, a coin register for registering the total value of coins received in terms of cents, dimes and dollars, a trip register for registering in terms of nickel or five cent fares, means for evaluating the coins received and transferring their value onto the coin register, gearing between the coin register and the trip register for transferring count to the trip register only when sufficient coins have been registered to pay for a nickel or five cent fare, and resetting means for resetting the trip register without disturbing the total on the coin register.

112. In combination, a coin measuring chamber having an inlet and an outlet, means for periodically depositing a single coin through the inlet and then closing the same, means in said chamber for measuring the value of the coin, register means for adding together and indicating the total of the coins thus measured and means for discharging the coin thus measured before another is introduced into the chamber.

In witness whereof I hereunto subscribe my name this 18th day of December, A. D. 1913.

ARTHUR H. WOODWARD.

Witnesses:
 ALBERT C. BELL,
 A. G. McCALEB.